US010028081B2

(12) United States Patent
Scanlon et al.

(10) Patent No.: US 10,028,081 B2
(45) Date of Patent: Jul. 17, 2018

(54) USER AUTHENTICATION

(71) Applicant: Bank of America Corporation, Charlotte, NC (US)

(72) Inventors: Sharon Scanlon, Manahawkin, NJ (US); Davindar Gill, Palatine, IL (US); Pete Bertanzetti, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 713 days.

(21) Appl. No.: 14/328,012

(22) Filed: Jul. 10, 2014

(65) Prior Publication Data

US 2016/0012412 A1 Jan. 14, 2016

(51) Int. Cl.
| | | |
|---|---|---|
| *G06Q 20/32* | (2012.01) | |
| *H04W 4/02* | (2018.01) | |
| *H04L 29/06* | (2006.01) | |
| *G06F 21/32* | (2013.01) | |

(Continued)

(52) U.S. Cl.
CPC ............. *H04W 4/02* (2013.01); *G06F 21/32* (2013.01); *G06F 21/35* (2013.01); *G06Q 20/3224* (2013.01); *G06Q 20/4012* (2013.01); *G06Q 20/40145* (2013.01); *H04L 63/0892* (2013.01); *H04L 63/107* (2013.01); *G06F 2221/2111* (2013.01); *G06F 2221/2141* (2013.01)

(58) Field of Classification Search
USPC .......................... 235/379, 380; 705/7, 30, 67
See application file for complete search history.

(56) References Cited

U.S. PATENT DOCUMENTS

| | | |
|---|---|---|
| 3,808,410 A | 4/1974 | Schlesinger |
| 4,700,295 A | 10/1987 | Katsof et al. |
| 5,581,630 A | 12/1996 | Bonneau, Jr. |

(Continued)

FOREIGN PATENT DOCUMENTS

KR 20090050383 A 5/2009

OTHER PUBLICATIONS

Co-pending U.S. Appl. No. 14/327,560.

(Continued)

*Primary Examiner* — Allyson Trail
(74) *Attorney, Agent, or Firm* — Banner & Witcoff, Ltd.; Michael A. Springs

(57) ABSTRACT

Systems, methods, apparatuses, and computer-readable media configured to determine a location of a user, identify the user and provide additional services based on the determined location and/or identity are provided. In some examples, a signal emitted from a beacon may be detected by a personal computing device of a user within a predefined proximity of the beacon. The location of the beacon, and the device detecting the signal, may be determined and the identity of the user associated with the device may be determined. Authentication information may be requested from the user. The request for authentication information may be transmitted to the personal computing device and the user may provide the authentication information via the device. If the received authentication information matches pre-stored authentication information, the user may be authenticated and/or authorized to conduct one or more transactions or types of transactions based on the determined location, identity, and authentication information.

20 Claims, 12 Drawing Sheets

(51) Int. Cl.
*G06F 21/35* (2013.01)
*G06Q 20/40* (2012.01)

(56) References Cited

U.S. PATENT DOCUMENTS

| | | | |
|---|---|---|---|
| 5,991,749 | A | 11/1999 | Morrill, Jr. |
| 6,513,015 | B2 | 1/2003 | Ogasawara |
| 6,563,423 | B2 | 5/2003 | Smith |
| 6,593,856 | B1 | 7/2003 | Madau |
| 6,624,739 | B1 | 9/2003 | Stobbe |
| 6,738,628 | B1 | 5/2004 | McCall et al. |
| 6,845,361 | B1 | 1/2005 | Dowling |
| 7,047,560 | B2 | 5/2006 | Fishman et al. |
| 7,111,174 | B2 | 9/2006 | Hamid |
| 7,149,533 | B2 | 12/2006 | Laird et al. |
| 7,181,252 | B2 | 2/2007 | Komsi |
| 7,466,224 | B2 | 12/2008 | Ward et al. |
| 7,536,316 | B2 | 5/2009 | Ozer et al. |
| 7,536,722 | B1 | 5/2009 | Saltz et al. |
| 7,543,738 | B1 | 6/2009 | Saunders et al. |
| 7,552,800 | B2 | 6/2009 | Puskala et al. |
| 7,712,657 | B1 | 5/2010 | Block et al. |
| 7,774,076 | B2 | 8/2010 | Skowronek |
| 7,778,855 | B2 | 8/2010 | Holliday |
| 7,814,016 | B2 | 10/2010 | Pranger |
| 7,904,718 | B2 | 3/2011 | Giobbi et al. |
| 7,911,334 | B2 | 3/2011 | Busey |
| 7,912,843 | B2 | 3/2011 | Murdock et al. |
| 7,962,361 | B2 | 6/2011 | Ramchandani et al. |
| 7,969,285 | B2 | 6/2011 | Bauchot et al. |
| 7,979,899 | B2 | 7/2011 | Guo et al. |
| 8,009,013 | B1 | 8/2011 | Hirschfeld et al. |
| 8,055,551 | B2 | 11/2011 | Milgramm et al. |
| 8,073,460 | B1 | 12/2011 | Scofield et al. |
| 8,078,146 | B2 | 12/2011 | Jayappa et al. |
| 8,091,778 | B1 | 1/2012 | Block et al. |
| 8,093,988 | B2 | 1/2012 | Takene et al. |
| 8,145,649 | B2 | 3/2012 | Murdock et al. |
| 8,186,578 | B1 | 5/2012 | Block et al. |
| 8,201,729 | B1 | 6/2012 | Block et al. |
| 8,229,787 | B2 | 7/2012 | Ramchandani et al. |
| 8,232,860 | B2 | 7/2012 | Goel |
| 8,259,692 | B2 | 9/2012 | Bajko |
| 8,260,707 | B2 | 9/2012 | Treadwell et al. |
| 8,295,898 | B2 | 10/2012 | Ashfield et al. |
| 8,332,232 | B2 | 12/2012 | Nickerson et al. |
| 8,350,700 | B2 | 1/2013 | Fast et al. |
| 8,369,266 | B2 | 2/2013 | Jin et al. |
| 8,401,897 | B1 | 3/2013 | Chatterjee |
| 8,413,209 | B2 | 4/2013 | Aldera et al. |
| 8,413,891 | B2 | 4/2013 | Long |
| 8,467,768 | B2 | 6/2013 | Mahaffey et al. |
| 8,527,575 | B2 | 9/2013 | Xiao et al. |
| 8,543,828 | B2 | 9/2013 | Albisu |
| 8,558,759 | B1 | 10/2013 | Prada Gomez et al. |
| 8,583,933 | B2 | 11/2013 | Granbery |
| 8,590,028 | B2 | 11/2013 | Saxena et al. |
| 8,606,712 | B2 | 12/2013 | Choudhuri et al. |
| 8,627,422 | B1 | 1/2014 | Hawkes et al. |
| 8,640,946 | B1 | 2/2014 | Block et al. |
| 8,666,821 | B2 | 3/2014 | Xie et al. |
| 8,666,895 | B2 * | 3/2014 | Grigg .................. G06Q 20/20 |
| | | | 235/380 |
| 8,671,001 | B1 | 3/2014 | Thompson et al. |
| 8,742,894 | B2 | 6/2014 | Seydoux |
| 9,166,967 | B2 | 10/2015 | Berkovitz et al. |
| 9,204,251 | B1 | 12/2015 | Mendelson |
| 9,204,257 | B1 | 12/2015 | Mendelson |
| 9,264,151 | B1 | 2/2016 | Emigh et al. |
| 9,265,450 | B1 | 2/2016 | Giobbi |
| 9,317,672 | B2 | 4/2016 | Carlson |
| 9,365,393 | B2 | 6/2016 | Salmikuukka et al. |
| 9,367,978 | B2 | 6/2016 | Sullivan |
| 9,380,417 | B1 | 6/2016 | Boyle et al. |
| 9,454,736 | B2 | 9/2016 | Reuveni et al. |
| 9,538,332 | B1 | 1/2017 | Mendelson |
| 2002/0035541 | A1 | 3/2002 | Makino et al. |
| 2002/0128850 | A1 | 9/2002 | Chen et al. |
| 2003/0200140 | A1 | 10/2003 | Hars |
| 2003/0200489 | A1 | 10/2003 | Hars |
| 2004/0093265 | A1 | 5/2004 | Ramchandani et al. |
| 2004/0093268 | A1 | 5/2004 | Ramchandani et al. |
| 2006/0119469 | A1 | 6/2006 | Hirai et al. |
| 2006/0163349 | A1 | 7/2006 | Neugebauer |
| 2007/0042748 | A1 | 2/2007 | MacArthur |
| 2007/0127693 | A1 | 6/2007 | D'Ambrosio et al. |
| 2007/0186258 | A1 | 8/2007 | Dapper et al. |
| 2007/0186261 | A1 | 8/2007 | Geile et al. |
| 2007/0192815 | A1 | 8/2007 | Geile et al. |
| 2007/0195689 | A1 | 8/2007 | Dapper et al. |
| 2007/0195901 | A1 | 8/2007 | Geile et al. |
| 2007/0195902 | A1 | 8/2007 | Geile et al. |
| 2007/0201573 | A1 | 8/2007 | Geile et al. |
| 2007/0206693 | A1 | 9/2007 | Geile et al. |
| 2007/0253595 | A1 | 11/2007 | Sorensen |
| 2007/0262134 | A1 * | 11/2007 | Humphrey ........... G06Q 20/105 |
| | | | 235/379 |
| 2008/0052151 | A1 | 2/2008 | Xie et al. |
| 2008/0067244 | A1 | 3/2008 | Marks |
| 2008/0097769 | A1 | 4/2008 | Galvin et al. |
| 2008/0114697 | A1 | 5/2008 | Black et al. |
| 2008/0150678 | A1 | 6/2008 | Giobbi et al. |
| 2008/0255929 | A1 | 10/2008 | Mouton |
| 2008/0312998 | A1 * | 12/2008 | Templeton ......... G06Q 10/0635 |
| | | | 705/7.28 |
| 2009/0037306 | A1 | 2/2009 | Hill |
| 2009/0076875 | A1 | 3/2009 | Lert, Jr. et al. |
| 2009/0241175 | A1 | 9/2009 | Trandal et al. |
| 2009/0252318 | A1 | 10/2009 | Smith et al. |
| 2009/0259499 | A1 | 10/2009 | Bhojwani et al. |
| 2009/0325629 | A1 | 12/2009 | Snyder |
| 2009/0328052 | A1 | 12/2009 | Nguyen et al. |
| 2009/0328182 | A1 | 12/2009 | Malakapalli et al. |
| 2010/0017874 | A1 | 1/2010 | Piccinini et al. |
| 2010/0042541 | A1 | 2/2010 | Kang et al. |
| 2010/0161433 | A1 | 6/2010 | White |
| 2010/0191581 | A1 | 7/2010 | Furin et al. |
| 2010/0198725 | A1 | 8/2010 | Naccache |
| 2010/0205063 | A1 | 8/2010 | Mersky |
| 2010/0277276 | A1 | 11/2010 | Bayne et al. |
| 2010/0287250 | A1 | 11/2010 | Carlson et al. |
| 2011/0028160 | A1 | 2/2011 | Roeding et al. |
| 2011/0029359 | A1 | 2/2011 | Roeding et al. |
| 2011/0029370 | A1 | 2/2011 | Roeding et al. |
| 2011/0078279 | A1 | 3/2011 | Grecco et al. |
| 2011/0086646 | A1 | 4/2011 | Gupta et al. |
| 2011/0178862 | A1 | 7/2011 | Daigle |
| 2011/0178863 | A1 | 7/2011 | Daigle |
| 2011/0191242 | A1 * | 8/2011 | Allen ................... G06Q 20/04 |
| | | | 705/43 |
| 2011/0202377 | A1 | 8/2011 | Maiya et al. |
| 2011/0208657 | A1 | 8/2011 | Rao |
| 2011/0213709 | A1 | 9/2011 | Newman et al. |
| 2011/0223895 | A1 | 9/2011 | Wagda et al. |
| 2011/0238499 | A1 | 9/2011 | Blackhurst et al. |
| 2011/0246306 | A1 | 10/2011 | Blackhurst et al. |
| 2011/0270618 | A1 | 11/2011 | Banerjee et al. |
| 2011/0313804 | A1 | 12/2011 | Camp et al. |
| 2011/0321031 | A1 | 12/2011 | Dournov et al. |
| 2012/0004769 | A1 | 1/2012 | Hallenbeck et al. |
| 2012/0047072 | A1 | 2/2012 | Larkin |
| 2012/0070041 | A1 | 3/2012 | Wang |
| 2012/0076183 | A1 | 3/2012 | Dapper et al. |
| 2012/0078673 | A1 | 3/2012 | Koke et al. |
| 2012/0078741 | A1 | 3/2012 | DeLine |
| 2012/0116929 | A1 | 5/2012 | Gventer et al. |
| 2012/0130840 | A1 | 5/2012 | Carlier et al. |
| 2012/0136479 | A1 | 5/2012 | Signorelli et al. |
| 2012/0143755 | A1 | 6/2012 | Burrell |
| 2012/0158297 | A1 | 6/2012 | Kim et al. |
| 2012/0185400 | A1 | 7/2012 | Eubanks, Jr. et al. |
| 2012/0195184 | A1 | 8/2012 | Dapper et al. |
| 2012/0197773 | A1 | 8/2012 | Grigg et al. |
| 2012/0197797 | A1 | 8/2012 | Grigg et al. |

(56) References Cited

U.S. PATENT DOCUMENTS

| | | |
|---|---|---|
| 2012/0197798 A1 | 8/2012 | Grigg et al. |
| 2012/0203892 A1 | 8/2012 | Pignataro et al. |
| 2012/0271692 A1 | 10/2012 | Huang et al. |
| 2012/0278115 A1 | 11/2012 | Acharya et al. |
| 2012/0278234 A1 | 11/2012 | Dent et al. |
| 2012/0320199 A1 | 12/2012 | Kundu et al. |
| 2012/0320214 A1 | 12/2012 | Kundu et al. |
| 2012/0321146 A1 | 12/2012 | Kundu et al. |
| 2012/0323642 A1 | 12/2012 | Camp et al. |
| 2013/0005253 A1 | 1/2013 | Grigg et al. |
| 2013/0005443 A1* | 1/2013 | Kosta ............... G07F 17/3206 463/25 |
| 2013/0024300 A1 | 1/2013 | Choudhuri et al. |
| 2013/0027561 A1 | 1/2013 | Lee et al. |
| 2013/0030915 A1 | 1/2013 | Statler et al. |
| 2013/0041797 A1 | 2/2013 | Geeslin et al. |
| 2013/0045758 A1 | 2/2013 | Khorashadi et al. |
| 2013/0048724 A1 | 2/2013 | Burnside et al. |
| 2013/0104214 A1 | 4/2013 | Beck et al. |
| 2013/0121131 A1 | 5/2013 | Dapper et al. |
| 2013/0138497 A1 | 5/2013 | Yan et al. |
| 2013/0150006 A1 | 6/2013 | Nunally et al. |
| 2013/0159195 A1 | 6/2013 | Kirillin et al. |
| 2013/0165154 A1 | 6/2013 | Joshi |
| 2013/0173387 A1 | 7/2013 | Adelaar |
| 2013/0173404 A1 | 7/2013 | Scipioni |
| 2013/0173492 A1 | 7/2013 | Leavenworth et al. |
| 2013/0182114 A1 | 7/2013 | Zhang et al. |
| 2013/0182904 A1 | 7/2013 | Zhang et al. |
| 2013/0198039 A1 | 8/2013 | Sridharan et al. |
| 2013/0203383 A1 | 8/2013 | Stopel et al. |
| 2013/0203439 A1 | 8/2013 | Lifshitz et al. |
| 2013/0211718 A1 | 8/2013 | Yoo et al. |
| 2013/0217416 A1 | 8/2013 | Matthews, III et al. |
| 2013/0238497 A1 | 9/2013 | Ramachandran et al. |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0268378 A1 | 10/2013 | Yovin |
| 2013/0275163 A1 | 10/2013 | Kaiser |
| 2013/0281084 A1 | 10/2013 | Batada et al. |
| 2013/0282589 A1* | 10/2013 | Shoup ............... G06F 21/34 705/67 |
| 2013/0282744 A1 | 10/2013 | Hartman et al. |
| 2013/0297422 A1 | 11/2013 | Hunter et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0332273 A1 | 12/2013 | Gu et al. |
| 2013/0346189 A1 | 12/2013 | Isaacs |
| 2014/0006219 A1 | 1/2014 | Wouhaybi et al. |
| 2014/0020073 A1 | 1/2014 | Ronda et al. |
| 2014/0032297 A1 | 1/2014 | Germann et al. |
| 2014/0032345 A1 | 1/2014 | Moore |
| 2014/0039950 A1 | 1/2014 | Appel et al. |
| 2014/0039951 A1 | 2/2014 | Appel et al. |
| 2014/0046718 A1 | 2/2014 | Schiller |
| 2014/0046830 A1 | 2/2014 | Orozco et al. |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0081858 A1* | 3/2014 | Block ............... G07F 19/207 705/43 |
| 2014/0105263 A1 | 4/2014 | Geile |
| 2014/0110481 A1 | 4/2014 | Burnside et al. |
| 2014/0114877 A1 | 4/2014 | Montano |
| 2014/0129441 A1 | 5/2014 | Blanco et al. |
| 2014/0149293 A1* | 5/2014 | Laracey ............... G06Q 20/108 705/44 |
| 2014/0162598 A1 | 6/2014 | Villa-Real |
| 2014/0188733 A1 | 7/2014 | Granbery |
| 2014/0201025 A1 | 7/2014 | Adoni et al. |
| 2014/0222603 A1 | 8/2014 | Hay |
| 2014/0258028 A1 | 9/2014 | Bynum et al. |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0279009 A1 | 9/2014 | Grigg et al. |
| 2014/0279450 A1 | 9/2014 | Gujral |
| 2014/0280316 A1 | 9/2014 | Ganick et al. |
| 2014/0289032 A1 | 9/2014 | Muto et al. |
| 2014/0297527 A1 | 10/2014 | McLaughlin et al. |
| 2014/0309770 A1 | 10/2014 | Signorelli et al. |
| 2014/0365255 A1 | 12/2014 | Burgess et al. |
| 2014/0365334 A1 | 12/2014 | Hurewitz |
| 2015/0018011 A1 | 1/2015 | Mendelson |
| 2015/0051976 A1* | 2/2015 | Brown ............... G06Q 30/0267 705/14.58 |
| 2015/0058159 A1 | 2/2015 | Balram et al. |
| 2015/0059002 A1 | 2/2015 | Balram et al. |
| 2015/0072618 A1 | 3/2015 | Granbery |
| 2015/0073980 A1 | 3/2015 | Griffin et al. |
| 2015/0081492 A1 | 3/2015 | Brereton et al. |
| 2015/0089585 A1 | 3/2015 | Novack |
| 2015/0126119 A1 | 5/2015 | Schulz et al. |
| 2015/0140982 A1 | 5/2015 | Postrel |
| 2015/0235161 A1 | 8/2015 | Azar et al. |
| 2015/0278829 A1 | 10/2015 | Lu et al. |
| 2015/0278888 A1 | 10/2015 | Lu et al. |
| 2015/0287014 A1 | 10/2015 | Granbery |
| 2015/0289111 A1 | 10/2015 | Ozkan |
| 2015/0302469 A1 | 10/2015 | Billou |
| 2015/0382137 A1* | 12/2015 | Prehn ............... G06F 17/3087 705/39 |
| 2016/0007157 A1 | 1/2016 | Tipton et al. |
| 2016/0277560 A1* | 9/2016 | Gruberman ............ H04W 8/245 |
| 2016/0335686 A1 | 11/2016 | AthuluruTlrumala et al. |
| 2017/0039616 A1 | 2/2017 | Korra et al. |

OTHER PUBLICATIONS

Co-pending U.S. Appl. No. 14/327,561.
Co-pending U.S. Appl No. 14/327,565.
Co-pending U.S. Appl No. 14/327,569.
Co-pending U.S. Appl No. 14/327,847.
Co-pending U.S. Appl No. 14/328,079.
Sep. 19, 2016 U.S. Non-Final Office Action—U.S. Appl. No. 14/327,728.
Jan. 31, 2017 U.S. Notice of Allowance—U.S. Appl. No. 14/327,728.
Jun. 7, 2017 U.S. Non-Final Office Action—U.S. Appl. No. 14/327,568.
May 12, 2017 U.S. Non-Final Office Action—U.S. Appl. No. 14/327,688.
Swedberg, Claire, "Yes Bank Uses RFID to Personalize Service", Oct. 13, 2008, RFID Journal, <http://www.rfidjournal.com/articles/view?4381 >, 2 pages.
"Qmatic Orchestra," product summary retrieved from <http://www.stech.com.pk/product/qmatic-orchestra/>, 10 pages.
Qmatic Valuing Time Catalog (Products and Systems for Customer Flow Management, unknown date) Obtained via <http://training.us.qmatic.com/pluginfile.php/385/mod_resource/content!8/Qmatic%20Product%20Catalog.pdf>, 26 pages.
Husmark, "4 Ways iBeacons Can Revolutionize Customer Service and Experience," obtained via <http://lp/qmatic.com/blog/4-ways-ibeacons-can-revolut>, 5 pages.
May 5, 2016 U.S. Non-Final Office Action—U.S. Appl. No. 14/327,767.
Aug. 4, 2016 U.S. Non-Final Office Action—U.S. Appl. No. 14/327,843.
Nov. 25, 2016 U.S. Final Office Action—U.S. Appl. No. 14/327,767.
Oct. 18, 2016 U.S. Non-Final Office Action—U.S. Appl. No. 14/327,967.
Mar. 23, 2017 U.S. Final Office Action—U.S. Appl. No. 14/327,967.

(56) References Cited

OTHER PUBLICATIONS

Jun. 19, 2017 U.S. Non-Final Office Action—U.S. Appl. No. 14/327,566.
Sep. 9, 2016 U.S. Non-Final Office Action—U.S. Appl. No. 14/327,570.
May 8, 2017 U.S. Final Office Action—U.S. Appl. No. 14/327,570.
May 19, 2017 U.S. Notice of Allowance—U.S. Appl. No. 15/478,586.
Apr. 28, 2017—U.S. Notice of Allowance—U.S. Appl. No. 14/327,895.
Nov. 18, 2016—U.S. Non-Final Office Action—U.S. Appl. No. 14/327,895.
Aug. 5, 2016—U.S. Final Office Action—U.S. Appl. No. 14/327,895.
May 18, 2017—U.S. Non-Final Office Action—U.S. Appl. No. 14/327,934.
Jun. 21, 2016—U.S. Non-Final Office Action—U.S. Appl. No. 14/328,147.
Jan. 12, 2017—U.S. Final Office Action—U.S. Appl. No. 14/328,147.
Marous, Jim, "10 Ways iBeacon Can Improve Banking Sales & Service", Mar. 31, 2014, The Financial Brand, retrieved from https://thefinancialbrand.com/38160/ibeacon-bank-branch-mobile-cross-selling/, 4 pages.
Berry, John, "How to Create an In-Branch Mobile Experience", Feb. 7, 2014, American Banker, retrieved from https://www.americanbanker.com/opinion/how-to-create-an-in-branch-mobile-experience, 3 pages.
Howden, Ben, "How banks can innovate using Apple's iBeacon", Feb. 23, 2014, Lighthouse.io Blog, retrieved from http://blog.lighthouse.io/banks-can-innovate-using-apples-ibeacon/, 3 pages.
Bender, Adam, "St. George Bank pings branch customers with iBeacon", May 13, 2014, Computerworld, retrieved from https://www.computerworld.com.au/article/621055/acma-mulls-5g-future-3-6ghz-spectrum, 2 pages.
Foo, Fran, "St. George getting to know your iface," May 13, 2014, The Australian, retrieved from http://www.theaustralian.com.au/business/technology/st-george-getting-to-know-your-iface/news-story/eab43c5797329c4fb70a94418416eeca, 3 pages.
Jul. 27, 2017—U.S. Non-Final Office Action—U.S. Appl. No. 14/327,560.
Dec. 28, 2017 U.S. Final Office Action—U.S. Appl. No. 14/327,560.
Jun. 16, 2016 U.S. Notice of Allowance—U.S. Appl. No. 14/327,561.
Mar. 23, 2017 U.S. Notice of Allowance—U.S. Appl. No. 14/328,079.
Dec. 28, 2017 U.S. Final Office Action—U.S. Appl. No. 14/327,565.
Dec. 14, 2017 U.S. Final Office Action—U.S. Appl. No. 14/327,568.
Dec. 28, 2017—(U.S.) Final Office Action—U.S. Appl. No. 14/327,566.
Cisco, "iBeacon—Frequently Asked Questions", Mar. 24, 2014, Cisco Public.
Charlton, Graham, "Five Examples of How Marketers Are Using iBeacons", Apr. 7, 2014, Econsultancy.
Newman, Nic, "Apple iBeacon Technology Briefing", Jan. 17, 2014, MacMillan Publishers Ltd., Journal of Direct, Data and Marketing Practice (2014) 15, 222-225. doi:10.1057/dddmp.2014.7.
DMI, "Beacon Technology: What's in It for Retailers", 2014, DMI Mobile Enterprise Solutions.
Smith, Paul, "Google Glass and Apple's iBeacon on the Way to a Bank Near You", Feb. 4, 2014, Financial Review.
Kar, Ian, "LevelUp Syncs With iBeacon to Connect with Customers Earlier", Jun. 14, 2014, Bank Innovation.
Silverman, Adam, "The Emergence of Beacons in Retail", Mar. 12, 2014, Forrester Research, Inc.
"iBeacon: You Can Take It to the Bank", Mar. 1, 2014, Before It's News.
Clancy, Heather, "Apple's iBeacon Signals Turning Point for Mobile Engagement", Mar. 1, 2014, Fortune.
Crosman, Penny, "Q&A with Westpac's Digital Chief on Wearable Computing, iBeacon", Feb. 19, 2014, American Banker.
Apple, Inc., "Getting Started with iBeacon" Verson 1.0, Jun. 2, 2014, Apple, Inc.
Jan. 8, 2018 U.S. Non-Final Office Action—U.S. Appl. No. 14/327,767.
Nov. 20, 2017—U.S. Final Office Action—U.S. Appl. No. 14/327,934.
Nov. 30, 2017—U.S. Non-Final Office Action—U.S. Appl. No. 14/328,147.
Jan. 22, 2018 U.S. Non-Final Office Action—U.S. Appl. No. 14/327,967.
Zibreg, Christian, "Apple Releases iBeacon Specification", Feb. 25, 2014, iDB, idownloadblog.com.

* cited by examiner

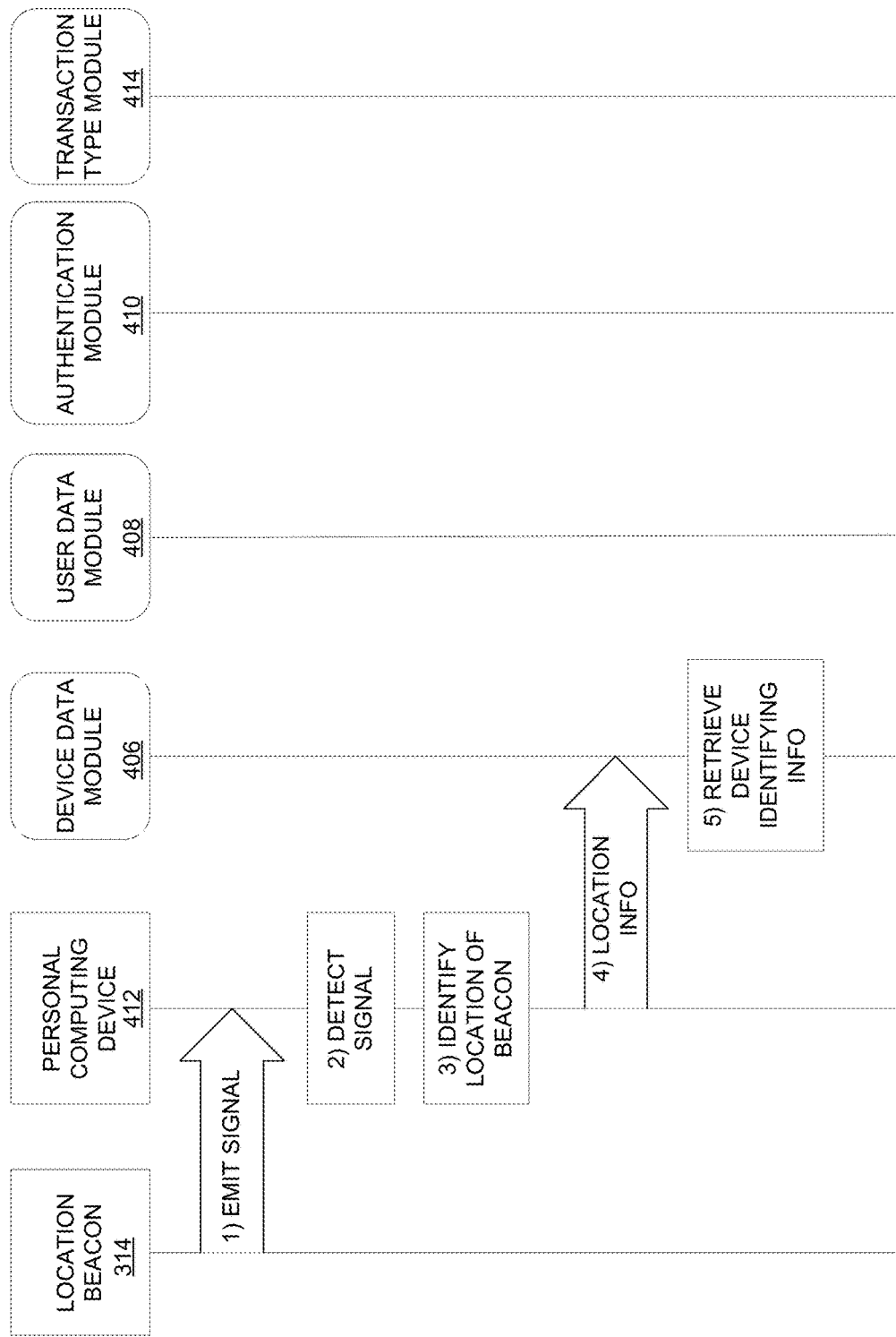

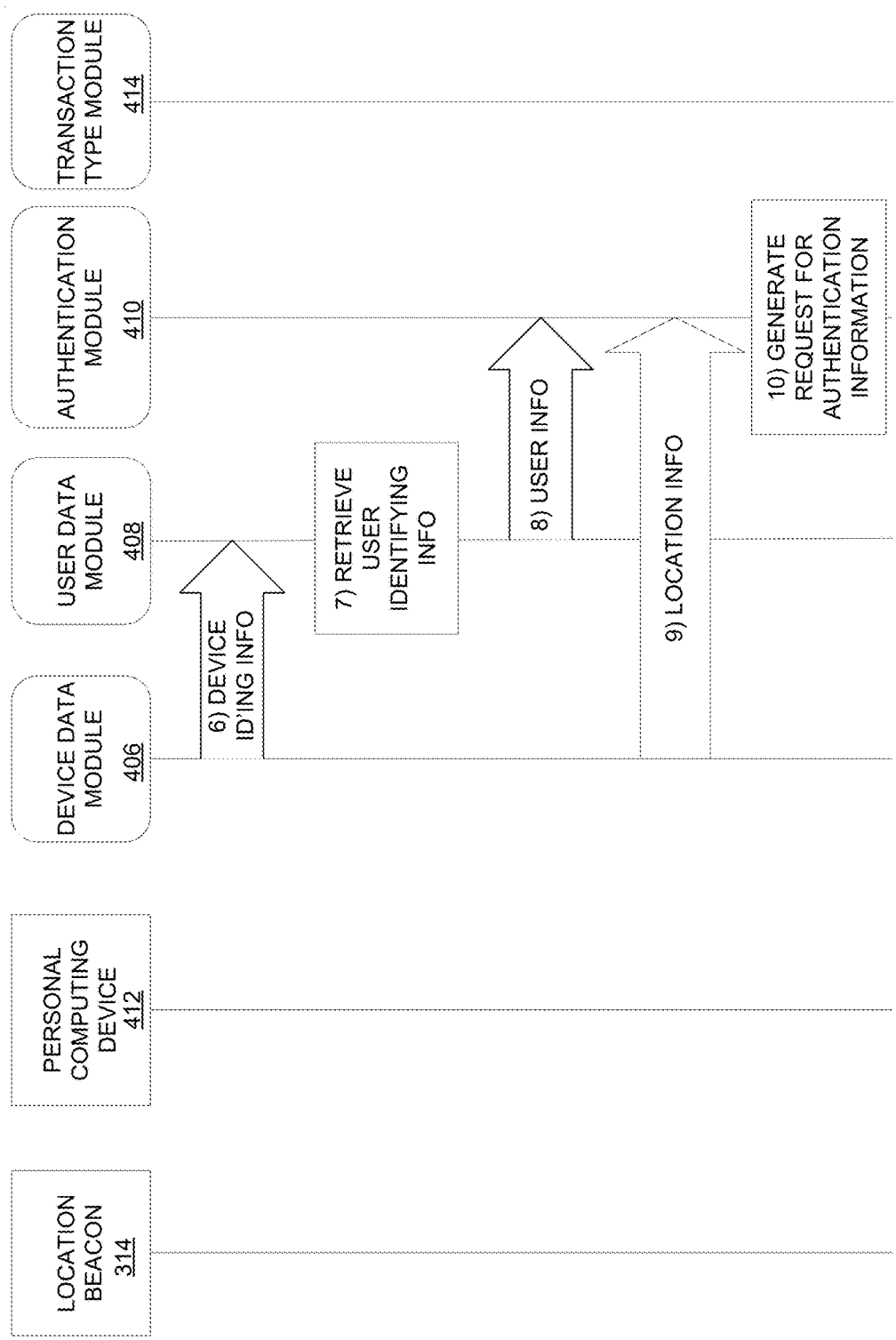

USER AUTHENTICATION

BACKGROUND

Companies that have a service component are often looking for ways to improve the experience that customers have when interacting with the company or its representatives, associates, and the like. Given the hectic schedules of people these days, it is important to provide efficient and effective customer service or assistance. Accordingly, any aspects of customer service processes or transactions that can be handled in advance (e.g., prior to the user initiating the transaction) or automatically, may simplify the transactions or streamline various processes.

SUMMARY

Aspects of the disclosure relate to various systems, methods, apparatuses, and computer-readable media configured to use proximity positioning systems to determine a location of a user, identify the user and provide additional services and/or functionality based on the determined location and/or identity. In some examples, a signal may be received or detected. The signal may be a low-power radio signal detectable within a predefined proximity and emitted from a location beacon. The signal may, in some examples, be detected by a personal computing device of a user. The location of the beacon, and the device detecting the signal, may be determined (e.g., based on previously stored location information associated with the beacon). The location information, as well as a unique identifier associated with the personal computing device of the user, may be used to identify a user associated with the personal computing device and the location of the user. This information may be used to provide additional services and/or functionality to the user.

For instance, in some arrangements, based on the determined location of a personal computing device and an identity of a user associated with the personal computing device, the system may request authentication information from the user. The authentication information may be used with, for example, the determined location and identity, to authorize (or pre-authorize) a user to conduct one or more transactions or types of transactions. The request for authentication information may be transmitted to the personal computing device and the user may provide the authentication information via the personal computing device. If the received authentication information matches pre-stored authentication information, the user may be authenticated and/or authorized to conduct one or more transactions or types of transactions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5D depict an illustrative event sequence for determining a location of a personal computing device, identifying a user associated with the personal computing device, and authenticating the user to conduct one or more transactions, according to one or more aspects discussed herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
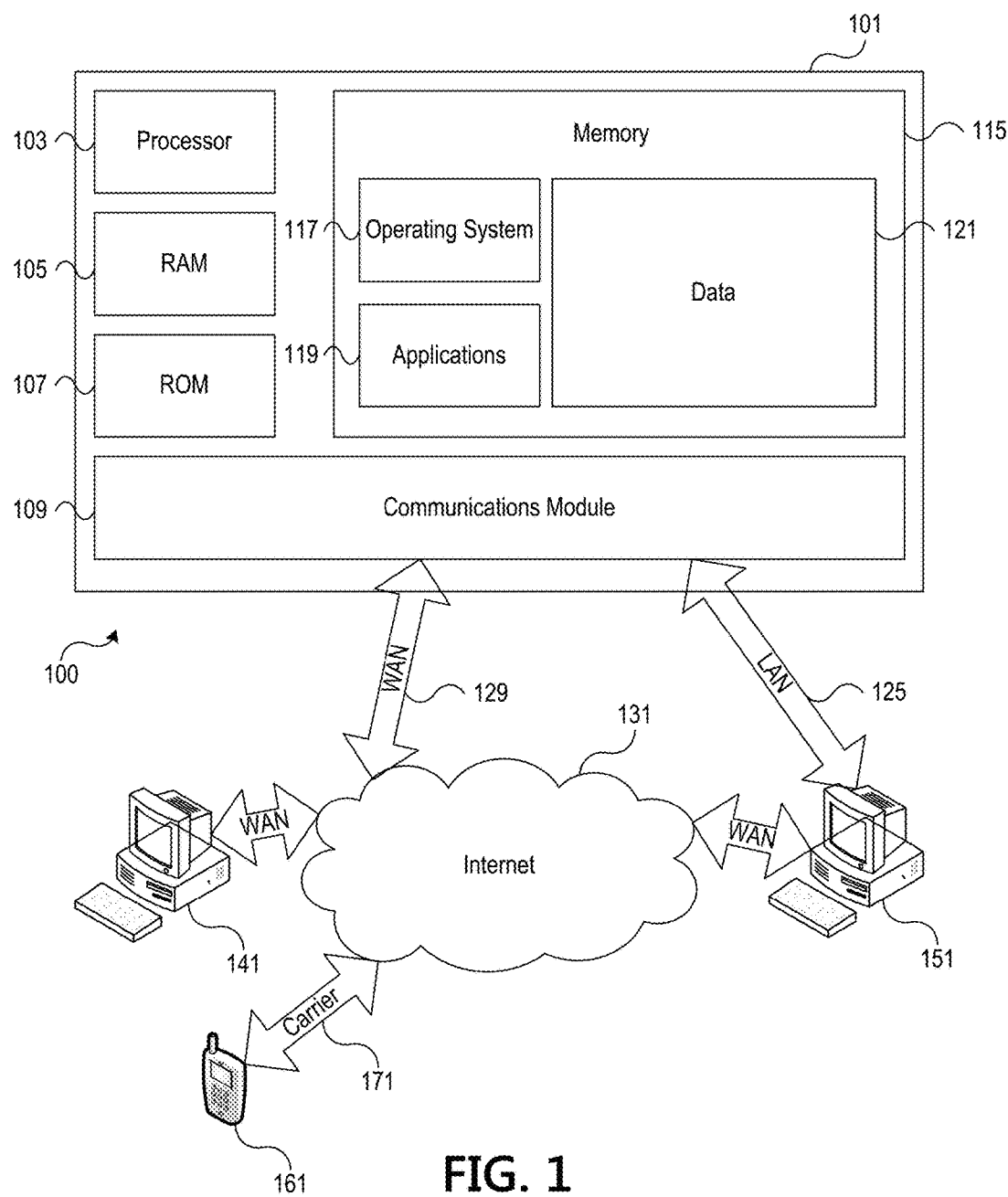
FIG. 1 depicts an illustrative operating environment in which various aspects of the disclosure may be implemented in accordance with one or more aspects discussed herein.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
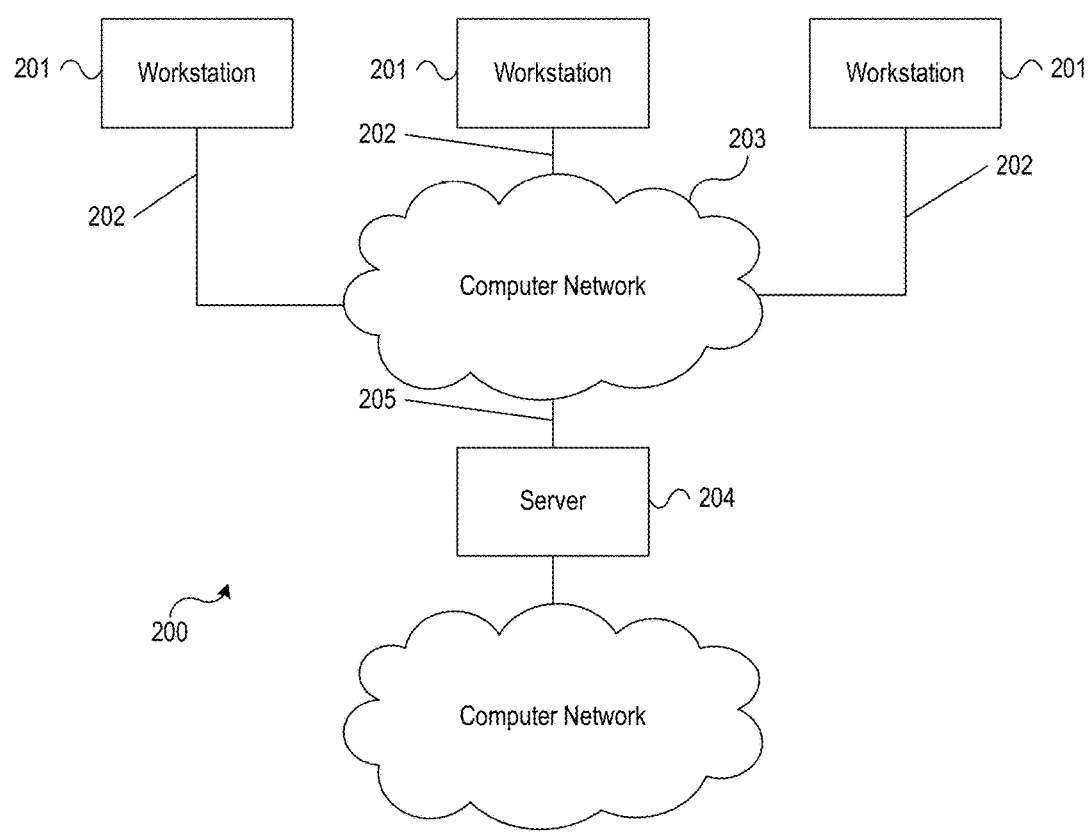
FIG. 2 depicts an illustrative block diagram of workstations and servers that may be used to implement the processes and functions of certain aspects of the present disclosure in accordance with one or more aspects discussed herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
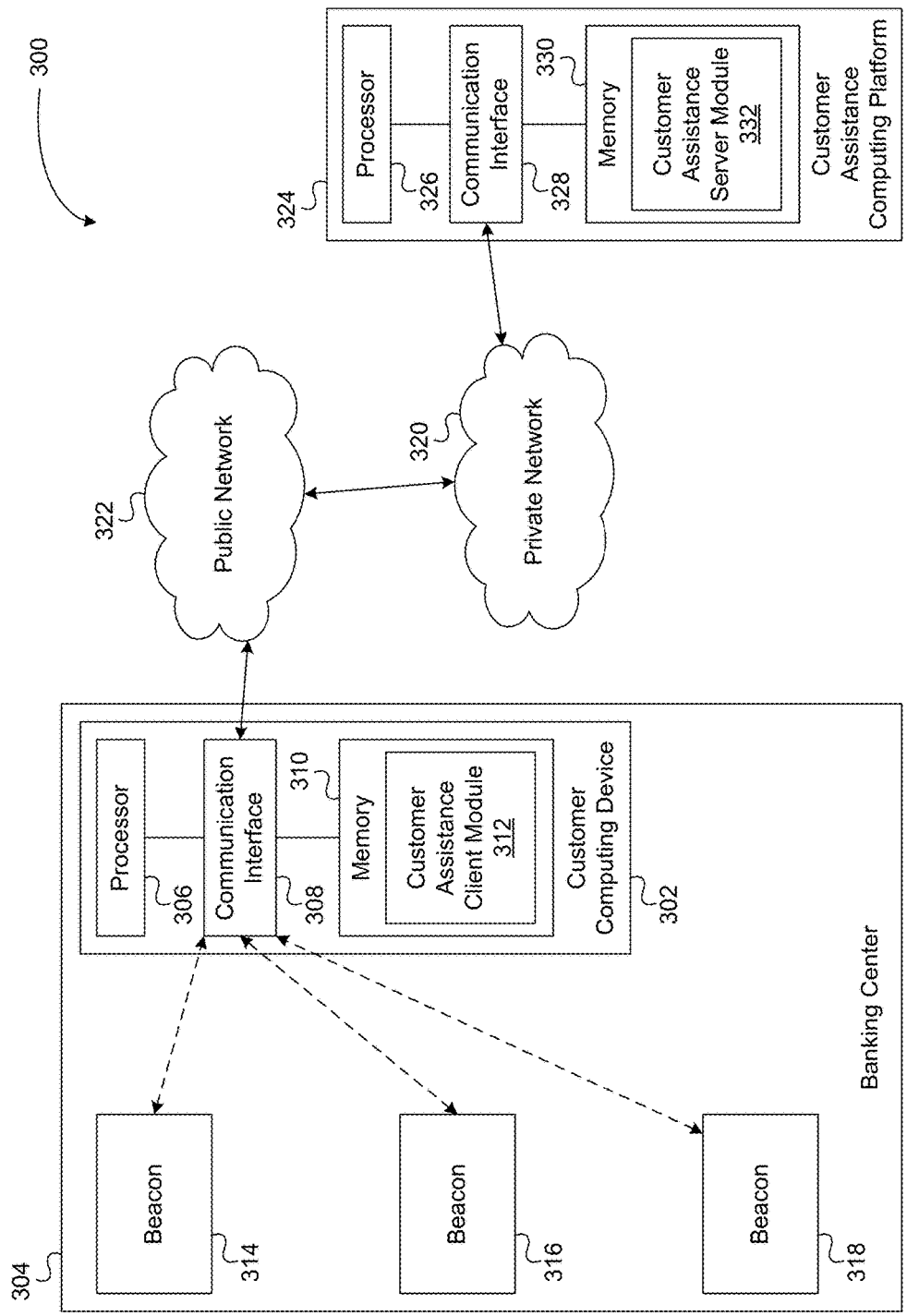
FIG. 3 depicts an illustrative computing environment for a proximity positioning system that may be used to provide location determination and user identification in accordance with one or more aspects discussed herein.

FIG. 3 depicts an illustrative computing environment for a location determination and user identification system in accordance with one or more example embodiments. Referring to FIG. 3, computing environment 300 may include one or more computing devices, such as customer computing device 302. Customer computing device 302 may be any type of computing device capable of receiving a user interface, receiving input via the user interface, and communicating the received input to one or more other computing devices. For example, customer computing device 302 may be a desktop computer, laptop computer, tablet computer, smart phone, or the like. In one or more arrangements, customer computing device 302 may be a personal computing device (e.g., a smart phone, a tablet computer, or any other type of mobile device) that belongs to and/or is used by a customer of a financial institution at and/or near a banking center 304 and/or any other location operated by, controlled by, and/or otherwise associated with the financial institution.

Computing environment 300 also may include one or more location beacons, such as location beacon 314, location beacon 316, and location beacon 318. Each location beacon (e.g., location beacon 314, location beacon 316, and location beacon 318) may be configured to transmit one or more radio signals that may be detected and/or received by other devices located in close proximity of and/or otherwise within a predetermined distance of the particular location beacon. In one or more embodiments, any and/or all of the location beacons included in computing environment 300 (e.g., location beacon 314, location beacon 316, and location beacon 318) may implement Bluetooth Low Energy (also referred to as "Bluetooth LE," "Bluetooth Smart," or "BLE") technology to transmit low-power radio signals. The particular signal(s) transmitted by a particular location beacon may include one or more attributes, such as a unique identifier assigned to and/or otherwise associated with the particular location beacon, that may enable the particular location beacon to be identified by a device receiving the particular signal(s) transmitted by the particular location beacon. As illustrated below, by detecting a particular signal transmitted by a location beacon (which may, e.g., be positioned at a specific location) and subsequently identifying the location beacon transmitting the particular signal, a computing device may be able to determine that it is located at and/or near the specific location where the location beacon is positioned.

For example, in one or more arrangements discussed below, the one or more location beacons (e.g., location beacon 314, location beacon 316, and location beacon 318) may be positioned at and/or near banking center 304, and may be specifically positioned at and/or near different areas of banking center 304, such as at a welcome area, at a teller counter or window, at a waiting area, at an external alcove where an automated teller machine (ATM) is located, at an external window where drive-up services are provided, at a parking lot, and/or in one or more other distinct areas of banking center 304. In addition, each location beacon may transmit a radio signal that may be detected and/or received by other devices at banking center 304, such as customer computing device 302, which may enable such devices to determine that they are present at banking center 304 and/or located at and/or near a particular area of banking center 304.

In one or more embodiments, customer computing device 302 may include at least one processor 306, communication interface 308, and/or memory 310. A data bus may interconnect processor 306, communication interface 308, and/or memory 310. Memory 310 may include one or more program modules comprising instructions that when executed by processor 306 cause customer computing device 302 to perform one or more functions described herein. For example, memory 310 may include customer assistance client module 312, which may include instructions that when executed by processor 306 cause customer computing device 302 to perform one or more functions described herein. Communication interface 308 may include one or more wired and/or wireless communication interfaces (e.g., network interfaces, radio interfaces, or the like) that are configured to support communication between customer computing device 302 and one or more other devices and/or networks. In one or more arrangements, communication interface 308 may include at least one network interface that facilitates communication between customer computing device 302 and one or more devices and/or networks that are located remotely from banking center 304, and communication interface 308 may further include at least one radio interface that facilitates communication between and/or enables customer computing device 302 to receive wireless radio signals from one or more location beacons (e.g., location beacon 314, location beacon 316, and location beacon 318) and/or other radio transmitters that may be located at and/or near banking center 304.

Computing environment 300 also may include one or more computing platforms. For example, computing environment 300 may include customer assistance computing platform 324. Customer assistance computing platform 324 may include one or more computing devices configured to perform one or more of the functions described herein. For example, customer assistance computing platform 324 may include one or more computers (e.g., laptop computers, desktop computers, servers, server blades, or the like).

Computing environment 300 also may include one or more networks, which may interconnect customer computing device 302, customer assistance computing platform 324, and/or one or more other computing devices. For example, computing environment 300 may include private network 320 and public network 322. Private network 320 and/or public network 322 may include one or more sub-networks (e.g., LANs, WANs, or the like). Private network 320 may be associated with a particular organization (e.g., a corporation, financial institution, educational institution, governmental institution, or the like) and may interconnect one or more computing devices associated with the organization. For example, customer assistance computing platform 324 may be associated with an organization, such as the financial institution that operates, controls, and/or is otherwise associated with banking center 304, and private network 320 may be operated by and/or otherwise associated with the organization, and may include one or more networks (e.g., LANs, WANs, VPNs, or the like) that interconnect customer assistance computing platform 324 and one or more other computing devices associated with the organization. Public network 322 may connect private network 320 and/or one or more computing devices connected thereto (e.g., customer assistance computing platform 324) with one or more networks and/or computing devices that are not associated with the organization. For example, customer computing device 302 might not be associated with the organization that operates and/or is associated with private network 320, and public network 322 may include one or more networks (e.g., the Internet) that connect customer computing device 302 to private network 320 and/or one or more computing devices connected thereto (e.g., customer assistance computing platform 324).

Customer assistance computing platform 324 may include at least one processor 326, communication interface 328, and/or memory 330. Memory 330 may include one or more program modules comprising instructions that when executed by processor 326 cause customer assistance computing platform 324 to perform one or more functions described herein. For example, memory 330 may include customer assistance server module 332, which may include instructions that when executed by processor 326 cause customer assistance computing platform 324 to perform one or more functions described herein. Communication interface 328 may include one or more wired and/or wireless communication interfaces (e.g., network interfaces, radio interfaces, or the like) that are configured to support communication between customer assistance computing platform 324 and one or more other devices and/or networks. For example, communication interface 328 may include at least one network interface that facilitates communication between customer assistance computing platform 324 and one or more other devices and/or networks (e.g., private network 320, public network 322, customer computing device 302, and/or other devices and networks).

Figure 4:
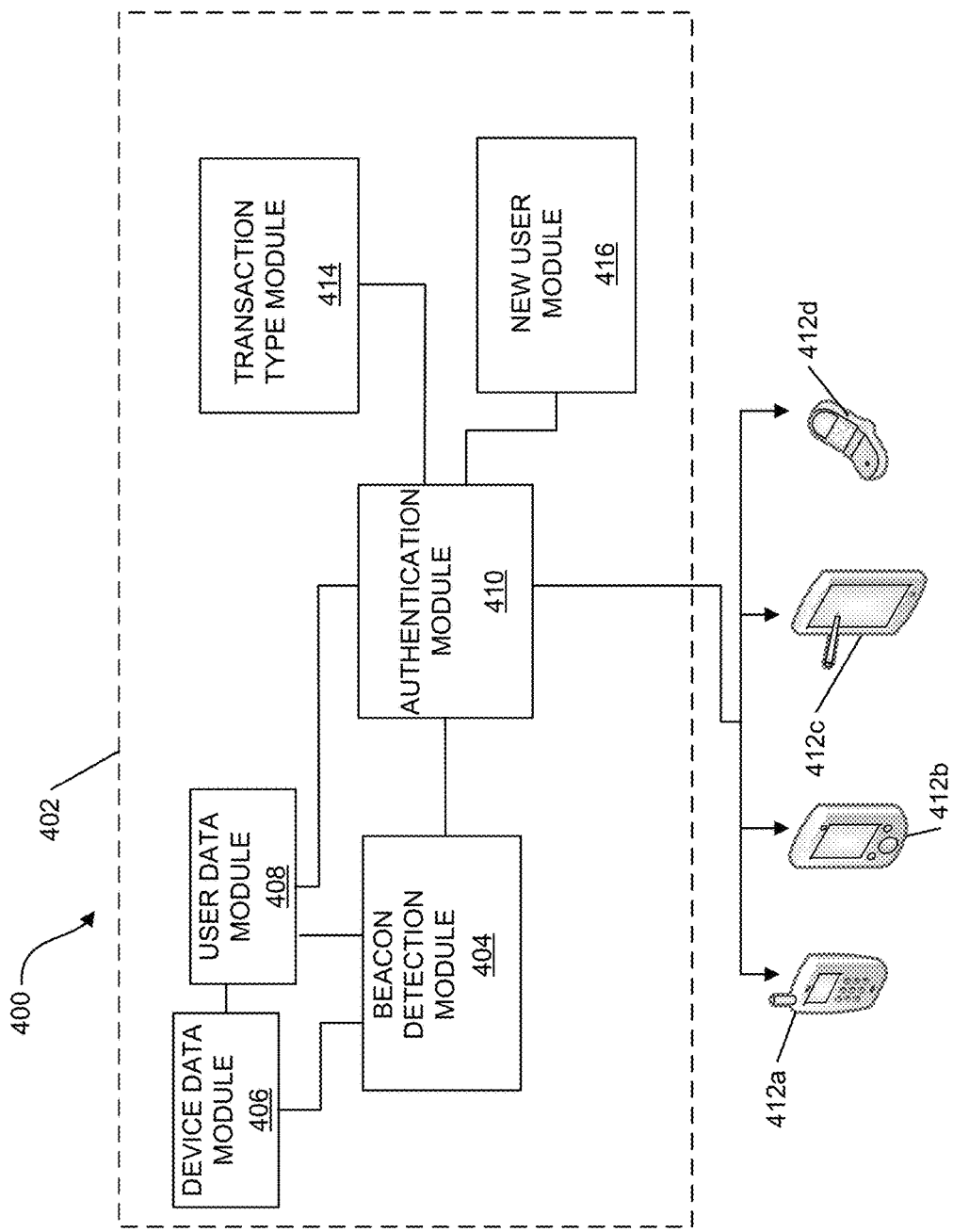
FIG. 4 illustrates one example location determination and user identification system according to one or more aspects discussed herein.

FIG. 4 illustrates one example location determination and user identification system 400 according to one or more aspects described herein. In some examples, the location determination and user identification system 400 may be part of, internal to or associated with an entity 402. The entity 402 may be a corporation, university, government entity, and the like. In some examples, the entity 402 may be a financial institution, such as a bank. Although various aspects of the disclosure may be described in the context of a financial institution, nothing in the disclosure shall be construed as limiting the location determination and user identification system to use within a financial institution. Rather, the system may be implemented by various other types of entities.

Further, some aspects of the location determination and user identification system 400 may be contained in one or more computing devices, servers, or the like. For instance, the location determination and user identification system 400 may include one or more modules that may be implemented in hardware and/or software configured to perform various functions within the system 400. One or more modules may be contained within the same physical device or may be housed in separate devices. Further, although one or more modules may be shown in FIG. 4 as within the entity 402, any of the modules may be located external to the entity 402 but may be associated with the entity. For instance, one or more modules may be associated with a personal computing device of a user. Accordingly, various functionality associated with the module may be performed at the personal computing device which may be located external to the entity but may be associated with the entity by way of a user associated with the device being associated with the entity 402, the device including or running an application, such as a mobile banking application, of the entity 402, and the like. Nothing in the disclosure should be viewed as limiting the one or more modules to a same physical location or a location within an entity.

Location determination and user identification system 400 may include a beacon detection module 404. The beacon detection module 404 may be implemented in hardware and/or software and may be configured to perform various functions within the system 400. For instance, the beacon detection module 404 may be configured to detect and/or receive a signal associated with one or more beacons, such as location beacons 314, 316, 318 in FIG. 3. The location beacons may be arranged within or in proximity to a location (e.g., a branch or banking center) and may be part of a proximity positioning system that may be used to identify a location of a computing device and, accordingly, a user associated with the computing device, as will be discussed more fully below.

The beacon detection module 404 may receive a signal emitted from one or more location beacons and may determine a location of the beacon and/or a personal computing device associated with a user that is within a predefined proximity of one or more location beacons. For instance, if a personal computing device, such as one of devices 412a-412d is in a location that is within a predefined proximity of one or more location beacons emitting a signal, the personal computing device 412a-412d (e.g., via the beacon detection module 404) may detect the signal and determine, such as from the received signal, a location of the beacon and/or a location of the device. In some examples, an application on the personal computing device 412a-412d may be used to detect the signal from the beacon and/or determine a location of the beacon and/or personal computing device 412a-412d.

The signal received from the beacon and/or data associated with the signal (such as location data) may be transmitted to a device data module 406. The device data module 406 may be implemented in hardware and/or software configured to perform various functions within the system. For instance, the device data module 406 may receive the signal from the beacon or data associated therewith from the beacon detection module 404 and may determine a unique identifier associated with the personal computing device 412a-412d associated with the beacon detection module 404 that detected the beacon. That is, the device data module 406 may determine a unique identifier, such as a phone number associated with a smart phone 412a, an international mobile station equipment identity (IMEI), or other unique identifier associated with the personal computing device within the predefined proximity of the beacon.

The signal from the beacon detection module 404 and/or the device identifier from the device data module 406 may be transmitted to a user data module 404. In some examples, the user data module 408 may be located remotely from the beacon detection module 404 and/or the device data module 406. For instance, the user data module 408 may be located in, for example, a back office of a financial institution. The user data module 408 may be implemented in hardware and/or software configured to perform various functions within the system 400. For instance, the user data module 408 may receive data from the beacon detection module 404 associated with a location of the beacon and/or a location of the personal computing device detecting the beacon signal. The user data module 408 may also receive the unique identifier retrieved from the device data module 406 to determine a user associated with the device and, therefore, a location of the user associated with the device based on the location of the device.

In some arrangements, a user may register with the system 400. Registration with the system 400 may include registering a unique identifier associated with one or more personal computing devices of the user (e.g., via user input, system detection of the personal computing device, or the like). Registration with the system 400 may also include providing identifying information associated with the user. For instance, a name, address, phone number, online or mobile banking user identification, and the like, may be provided in registering with the system. In some examples, the system 400 may obtain registration information directly from the user (e.g., via an online or other direct registration process). Additionally or alternatively, the system 400 may obtain some or all of the registration information from information a user provided to an online banking application, mobile banking application, or the like.

In some arrangements, the registration information may be stored in the user data module 408. Accordingly, upon receiving information associated with a beacon signal and/or a unique identifier associated with a personal computing device, the user data module 408 may determine or identify a user associated with the personal computing device. Thus, the fact that the device associated with the user has detected a beacon signal indicates that the device is (at least likely) within a predefined proximity of the beacon and, thus, the user is also (at least likely) within the same proximity of the beacon. If the beacon is located within a particular location, such as a branch or banking center of a financial institution, this information may be used to determine when a user is within the branch and provide additional services, functionality, etc. to the user based on the identification of the user and determination of the location of the user based on the determined location of the personal computing device associated with the user.

One example of an additional service or functionality that may be provided based on the determined identification and location of the user may be to permit the user to provide additional authenticating information via the personal computing device detecting the beacon signal in order to provide a more efficient experience for the user. For instance, a user may enter a banking center and a signal emitted by a location beacon within the banking center may be detected by the user's personal computing device. Accordingly, the system may identify the user (as discussed herein) and may request authenticating information from the user. The authenticating information may include a personal identification number (PIN) of the user, password, biometric data, response to predefined security questions, or the like. The authentication of the user via the personal computing device may reduce or eliminate the need for the user to provide additional identification or authentication in order to conduct transactions. For instance, if the user was attempting to make a withdrawal, in a conventional system, the user may be required to show photo identification. However, by authenticating the user via the personal computing device associated with the user, the user may complete the withdrawal without providing any additional identification and/or authentication (e.g., photo identification). These and various other examples will be discussed more fully below.

The location determination and user identification system 400 may include an authentication module 410. The authentication module 410 may be implemented in hardware and/or software configured to perform various functions within the system. For instance, the authentication module 410 may receive information (such as from user data module 408, device data module 406, or the like) associated with an identity of a user having a physical presence at a location. For instance, the user may be determined to be at or near a particular location (e.g., based on the user's personal computing device detecting a signal from a location beacon). The information may include the identity of the user and may prompt the authentication module 410 to generate a request for authentication information from the user. The request may be transmitted to the personal computing device 412 detecting the signal from the location beacon. The requested authentication information may include a PIN of the user, password associated with the user, biometric data of the user, such as a fingerprint, thumb print, retinal scan, or the like, response to predefined security questions (e.g., mother's maiden name, what street did you grow up on, or the like), or the like.

In response to the request for authentication information, the user may provide the requested authentication information to the system, e.g., via the personal computing device 412. For instance, the user may input the requested information, such as a PIN, password, response to security question, biometric data, or the like, via the personal computing device 412. The authentication module 410 may then determine whether the received authentication information matches authentication information in the system (e.g., response to predefined security questions matches preset answer, biometric data matches, password or PIN is correct, and the like). If so, the user is authenticated and may be authorized to conduct one or more transactions, or types of transactions, without requiring any additional user identification or authentication.

In some examples, the user may be prompted for authentication information upon or after initiating a transaction. Accordingly, the authentication may be used to authenticate the user for the initiated transaction and, accordingly, if the user is authenticated, the user may be authorized to complete the transaction and, in some examples, may do so without presenting additional identifying or authenticating information.

In other examples, the user may be authenticated (e.g., the request for authentication information may be transmitted to the user) upon the user's personal computing device detecting the beacon signal, the user being identified, or the like. Accordingly, the authentication might not be related to a particular transaction, but generally to a variety of transactions or types of transactions. Accordingly, the system 400 may include a transaction type module 414 that may identify one or more transactions, or types of transactions, that the user may conduct without requiring additional identification or authentication, and/or one or more transactions, or types of transactions, that may still require additional identification or authentication.

For instance, the transaction type module 414 may identify one or more thresholds for transactions, such that if the transaction or type of transaction is at or above the threshold, additional information may be required and, if not, no additional information is required. For example, the transaction type module 414 may determine that any withdrawals greater than $1000 may require additional information. In other examples, the limit may be higher (e.g., $5000, $10,000, or the like).

In some examples, certain types of transactions may be identified by the transaction type module 414 as not requiring additional information, while other types of transactions may require additional information. For instance, some example transactions that might not require additional identification or authentication information may include a deposit, a low dollar amount withdrawal, a payment on a loan or mortgage, requesting a small dollar amount loan (e.g., below a certain threshold), and the like.

Some example transactions that may require or cause a banking associated to request additional identification and/or authentication information may include, requesting an additional credit or debit card associated with an account, requesting a credit increase, opening an account, applying for a loan or mortgage, and the like.

Various other types of transactions may be identified by the transaction type module 414 without departing from the invention.

Accordingly, the transaction type module 414 may, in some examples, identify a first plurality of transactions or types transactions that may be completed or conducted without requiring additional identification or authentication information, as well as a second plurality of transactions or types of transactions that may require, or cause the banking associate to request, additional identification and/or authentication information. In some examples, the first plurality and second plurality may each be a subset of a larger plurality of transactions or types of transactions available to a user. Additionally or alternatively, the first plurality and second plurality together may constitute all transactions available to a user (e.g., each available transaction will be associated with one of the first plurality or second plurality).

In some examples, the threshold or types of transactions associated with each category (e.g., those that may not require additional information vs. those that may require additional information) may be customized based on the user. For instance, if the user has a balance in accounts associated with a financial institution at or above a certain threshold, then the user may be able to conduct additional, greater dollar value, or the like, transactions without requiring additional identification and/or authentication information.

Authentication of the user, as well as the transactions or types of transactions which the user is authorized to conduct without additional identification and/or authentication information, may be transmitted to the user (e.g., via a notification to the personal computing device 412) as well as to the financial institution or banking center (e.g., to a computer terminal of one or more banking associates who may be assisting the user).

The location determination and user identification system 400 may further include a new user module 416. The new user module 416 may be implemented in hardware and/or software and may be configured to perform various functions within the system 400. For instance, the new user module 416 may be used to provide additional functionality to users who have a personal computing device in proximity to a location beacon, and thus detecting a signal from the beacon, but who either are not customers of the entity (e.g., financial institution) at which the location beacon is located, or are not registered with the system and, thus, are not prompted for authentication information.

In some arrangements, the user data module 408 may be unable to identify a user associated with a personal computing device 412 detecting a signal from a location beacon within a predefined proximity of the personal computing device 412. This may indicate that the user associated with the personal computing device 412 has not registered with the system or is not associated with (e.g., not a customer of) the financial institution at which the location beacon is located. Accordingly, this information may be transmitted to the new user module 416 to generate additional offers, and the like, to transmit to the user (e.g., to the personal computing device 412 of the user).

For instance, the new user module 416 may generate an offer to the identified new user to download an application (e.g., to the personal computing device) that may be used to provide additional functionality. In another example, the new user module 416 may generate and transmit an offer to the personal computing device offering to register the user with the location determination and user identification system 400 so that, the next time the user is at that particular location (e.g., based on the personal computing device 412 of the new user detecting the signal from the location beacon) the user may be prompted to submit authentication information and may be authorized to conduct one or more transactions without requiring additional identification or authentication. In some examples, registration with the system may be performed by user who are associated with the financial institution or other entity at which the location beacon is arranged (e.g., customer of the bank) or with users who are not associated with the financial institution (e.g., do not have any accounts there, or the like) but who may conduct one or more transactions at that bank (e.g., use the ATM, cash a check, or the like). Thus, registration with the location determination and user identification system 400 may be performed by users who are customers of the bank, as well as those who are not customers of the bank.

Additionally or alternatively, the new user module 416 may also generate and transmit one or more offers to the personal computing device associated with services provided by the financial institution. For instance, a new user may be unfamiliar with one or more products or services offered so the new user module 416 may generate and transmit an offer to the user to open a new account, transfer a balance, such as a credit card balance, apply for a loan, and the like. Additional advertisements or offers may be provided to the new user without departing from the invention.

These and other arrangements will be discussed more fully below.

FIGS. 5A-5D depict an illustrative event sequence for utilizing a location determination and user identification system in accordance with one or more aspects discussed herein. The example shown in FIGS. 5A-5D is merely one example sequence and various other steps, processes, or the like, may be included in a sequence without departing from the invention.

Referring to FIG. 5A, at step 1 a signal may be emitted from a location beacon, such as location beacon 314 in FIG. 3. The signal may include data identifying the location beacon and/or a location of the location beacon. In some examples, the location beacon may be located in a first branch or banking center of a financial institution.

At step 2, the signal emitted by the location beacon may be detected, such as by a personal computing device 412. As discussed above, the signal emitted by the location beacon may be a low-power radio signal such that detection of the signal might be possible when the personal computing device is within a predefined proximity of the beacon. Accordingly, the personal computing device must be near to the first beacon in order to detect the signal.

Based on the received signal, a location of the location beacon, and, thus, an approximate location of the personal computing device, may be determined in step 3. For instance, in some examples, the personal computing device may include an application configured to communicate with the beacon and/or receive and/or provide information associated with the beacon, location, and the like, to a system associated with an entity, such as a financial institution. Example applications may include online banking applications and/or mobile banking applications. Accordingly, the application may detect the signal associated with the beacon and determine a location of the beacon (and thus an approximate location of the personal computing device). Determining the location of the location beacon may be based on records stored on the personal computing device, or accessible via the online banking application or mobile banking application, identifying locations of beacons. For instance, the location of beacons in each branch of the financial institution may be accessible via the online banking application or mobile banking application.

Although the example above includes identifying the location of the location beacon and/or the personal computing device by the personal computing device (or application associated therewith), in some arrangements, the signal or data associated with the signal, may be transmitted from the personal computing device to another computing device or server in order to identify the location. For instance, the signal or data associated therewith may be transmitted (in some examples, from the personal computing device) to a server at a back office of a financial institution, such as customer assistance computing platform 324 in FIG. 3. The location of the location beacon, and approximate location of the personal computing device, may then be determined at the remote server or platform using processes similar to those discussed above.

At step 4, the determined location of the location beacon may be transmitted, for instance to a device data module 406, to retrieve device identifying information in step 5. As discussed above, device identifying information may include IMEI of the device, and the like.

Referring to FIG. 5B, the device identifying information retrieved associated with the personal computing device, may be transmitted, for instance, to the user data module 408 in step 6. The user data module 408 may receive the device identifying information and use it to identify a user associated with the personal computing device. For instance, the device identifying information may be used to determine an identity of a user associated with the personal computing device from, for example, a look up table of information provided by various users during, for example, a registration process. Information associated with the identified user may be retrieved in step 7.

At step 8, the user identification information may be transmitted to an authentication module 410. At step 9, the determined location information may also be transmitted to the authentication module 410. Accordingly, the authentication module 410 may recognize that the user is in a particular location (e.g., has a physical presence at a particular location based on detection of the beacon signal by the personal computing device) and may, in step 10, generate a request for authentication information of the user. As discussed herein, the authentication information may be used to authenticate a user and authorize the user to conduct one or more transactions or types of transactions and may, in some examples, be based on the identified location of the user and identity of the user.

Figure 5C:
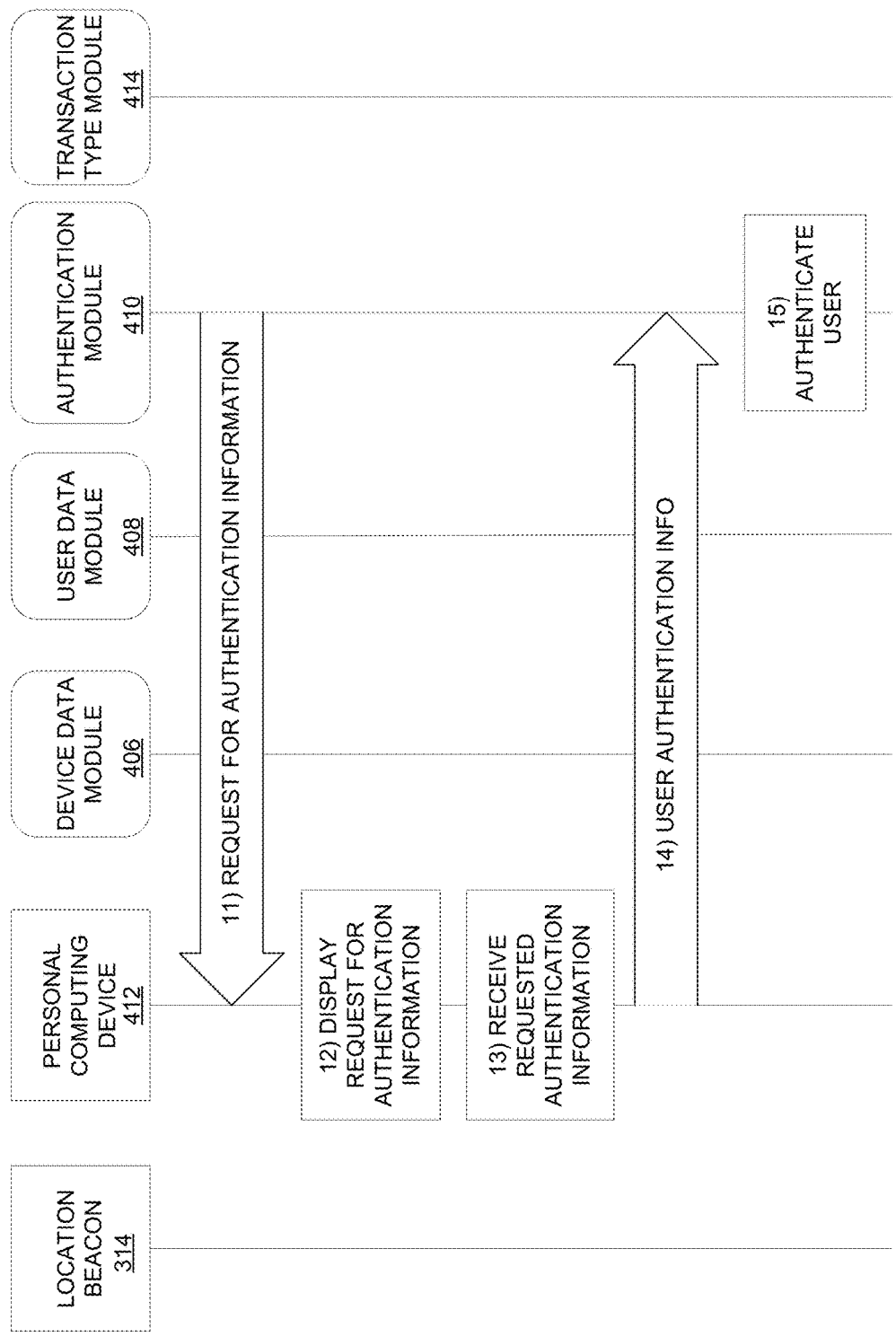

With reference to FIG. 5C, a request for authentication information may be transmitted to the personal computing device in step 11. At step 12, the request for authentication information may be displayed to the user on the personal computing device. The requested information may include a PIN, password, biometric data, response to predefined security question, and the like. In step 13, the personal computing device may receive the requested authentication information and may transmit that information to the authentication module in step 14.

Figure 5D:
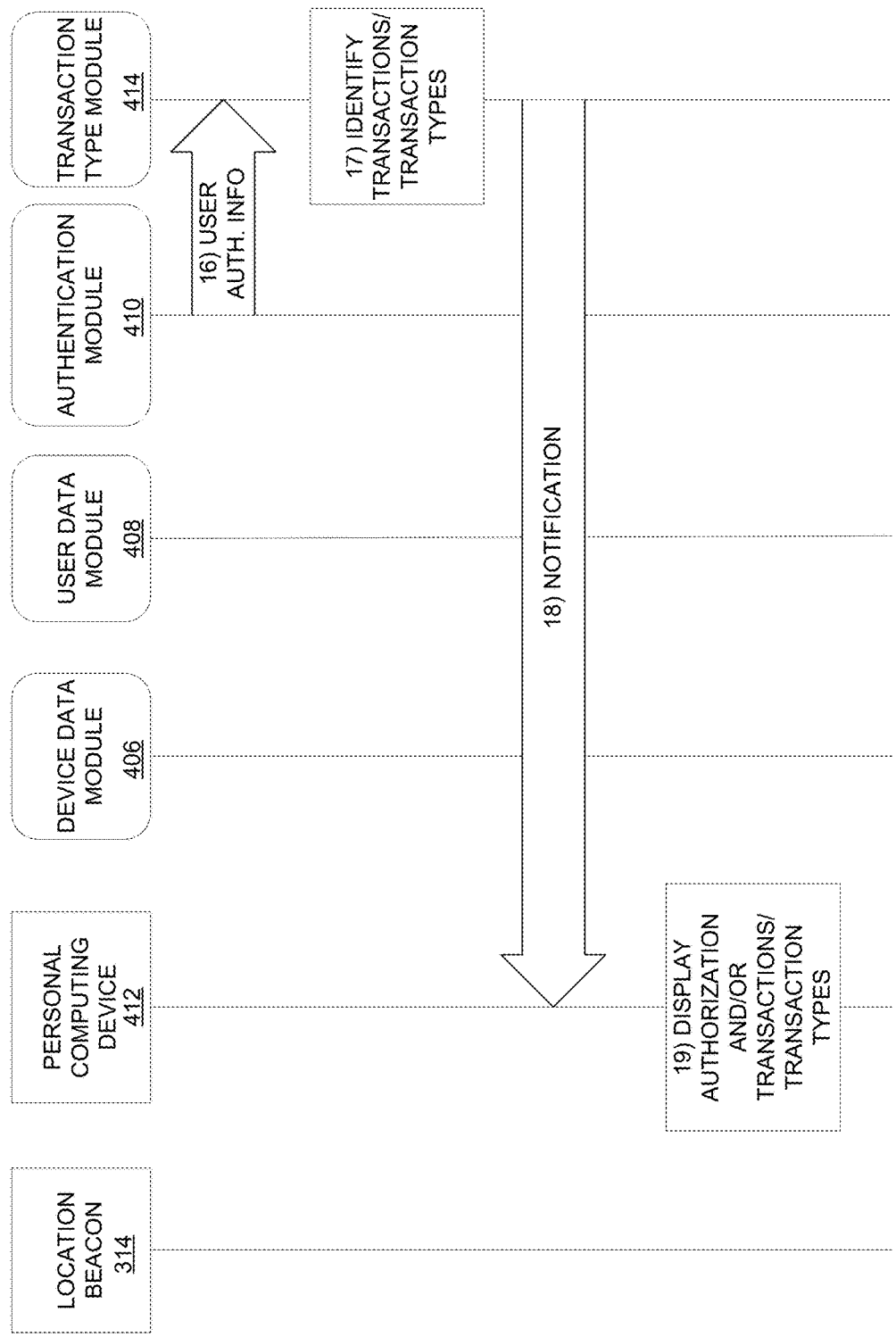

In step 15, the user may be authenticated, such as by the authenticating module. With reference to FIG. 5D, the authentication of the user may be transmitted to the transaction type module 414 at step 16. In step 17, the transaction type module may identify a plurality of transactions or types of transactions that the user may conduct without providing any additional identification and/or authentication information. In some examples, the transaction type module may also identify a plurality of transactions or types of transactions that may include a request for additional identification and/or authentication information.

In step 18, a notification of the authentication and/or the types of transactions available without providing additional identification and/or authentication may be transmitted to the personal computing device 412. In step 19, the transmitted information, or a portion thereof, may be displayed to the user. For instance, the personal computing device may display an indication that the user has been authorized to conduct some transactions or types of transactions. Additionally or alternatively, the display may include some examples of transactions that may be conducted without the user providing additional identification and/or authentication information.

Various additional steps may be provided in this or other event sequences without departing from the invention. For instance, steps associated with identifying the user as a new user, providing a request to register, and the like, as discussed herein, may be provided in this or other event sequences without departing from the invention.

Figure 6:
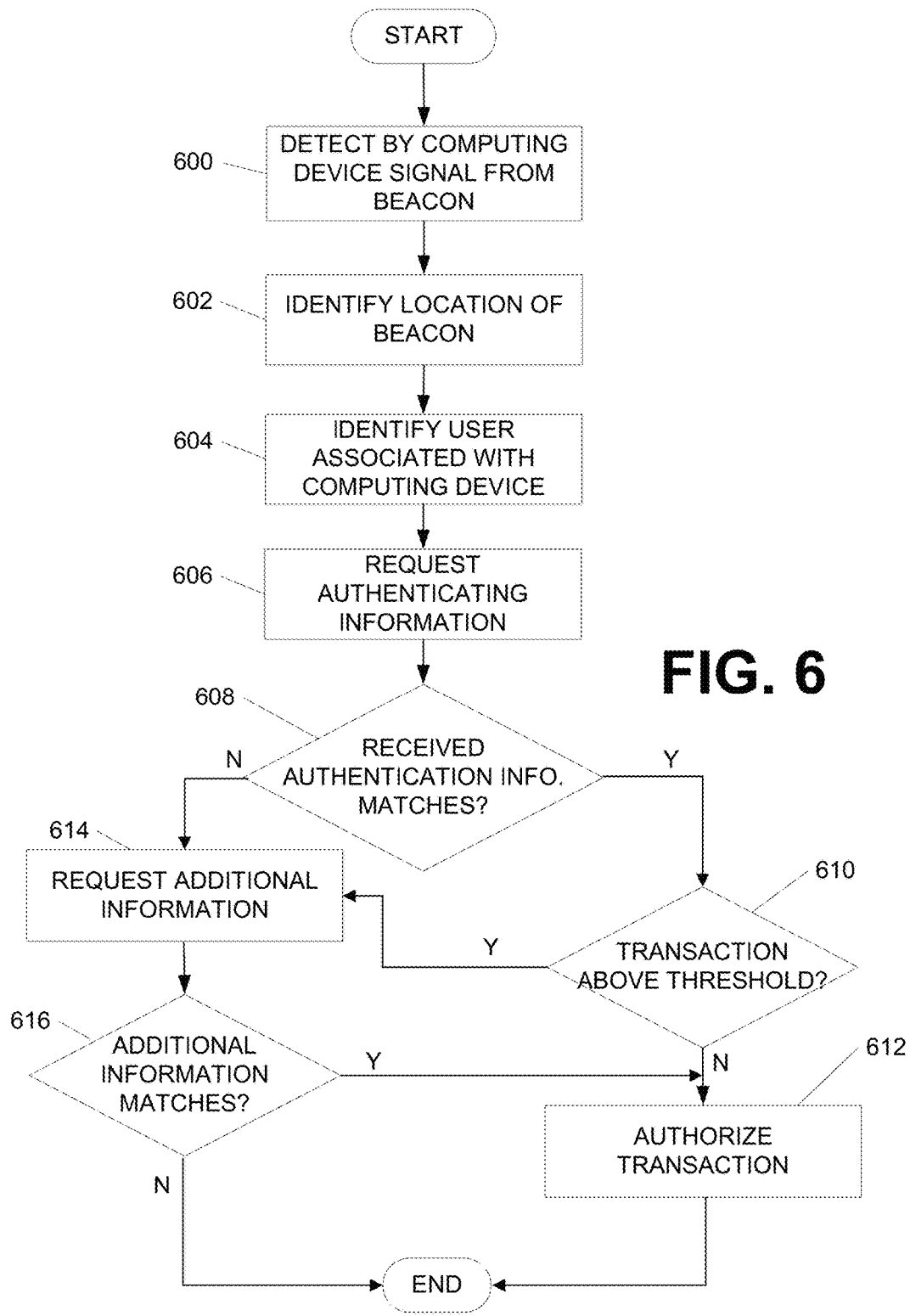
FIG. 6 illustrates one example method of authenticating a user according to one or more aspects discussed herein.

FIG. 6 illustrates one example method of authenticating a user according to one or more aspects discussed herein. In step 600, a signal from a location beacon may be detected by a personal computing device. As discussed above, the signal may be a low-power radio signal that may only be detectable when the detecting device (e.g., the personal computing device) is within a predetermined proximity of the beacon, which may be a relatively small distance. In step 602, the location of the beacon and, thus, the personal computing device, may be determined. The location may be determined in various ways, as discussed above.

In step 604, a user associated with the personal computing device may be identified. As discussed above, the user may be identified based on the unique identifier associated with the personal computing device, registration records or information, online or mobile banking information provided, or the like.

In step 606, authentication information may be requested from the user. In some examples, the request for authentication information may be automatically transmitted to the user upon determining the location and identity of the user. Accordingly, many types of transaction may be preauthorized if the user is authenticated, thereby providing a more efficient experience for the user (e.g., no need to provide additional information which may streamline transactions and take less time). The request for authentication information may be transmitted to the personal computing device of the user and may include one or more of a PIN of the user, password of the user, biometric data of the user, answer to one or more predefined security questions of the user, and the like. The user may input the requested authentication information and, in step 608, a determination may be made as to whether the received requested authentication information matches pre-stored information associated with the user.

For instance, the received authentication information may be compared to information stored on the system (e.g., via the authentication module 410 in FIG. 4). For example, a received response to a security question may be compared to the stored response provided by the user (e.g., at registration with the system or at a later time) to determine whether the responses match. Similar comparisons may be made between a received PIN and a stored PIN, received biometric data and stored biometric data, and the like.

If, in step 608, the received authentication information matches the stored information, in step 610 a determination may be made as to whether a transaction being conducted is above a transaction threshold. For instance, if the transaction is above a certain dollar amount and/or the type of transaction is one that may require additional information, then, in step 614, additional information may be requested from the user. The additional information may include identification and/or authentication information, such as a photo identification, signature, or the like. In step 616, a determination may be made as to whether the received additional information matches prestored information (e.g., signature matches, photo on identification matches photo in records). If so, the transaction may be authorized in step 612. If not, the process may end and/or the transaction may be denied.

If, in step 610, the transaction is not above the threshold (e.g., is at or below the threshold), then the transaction may be authorized in step 612. For instance, if the transaction is a low dollar amount, is a type that does not require additional information, or the like, the transaction may be authorized without requiring any additional information from the user.

That is, the determined location of the user, coupled with the authentication information provided by the user, may be sufficient to authenticate the user.

If, in step 608, the received authentication information does not match the stored records of the user, additional information may be requested from the user in step 614. Similar to the arrangement above, the requested additional information may include a photo identification, signature, or the like. If, in step 616, the received additional information matches records, the transaction may be authorized in step 612. If not, the transaction may be denied and/or the process may end.

Figure 7:
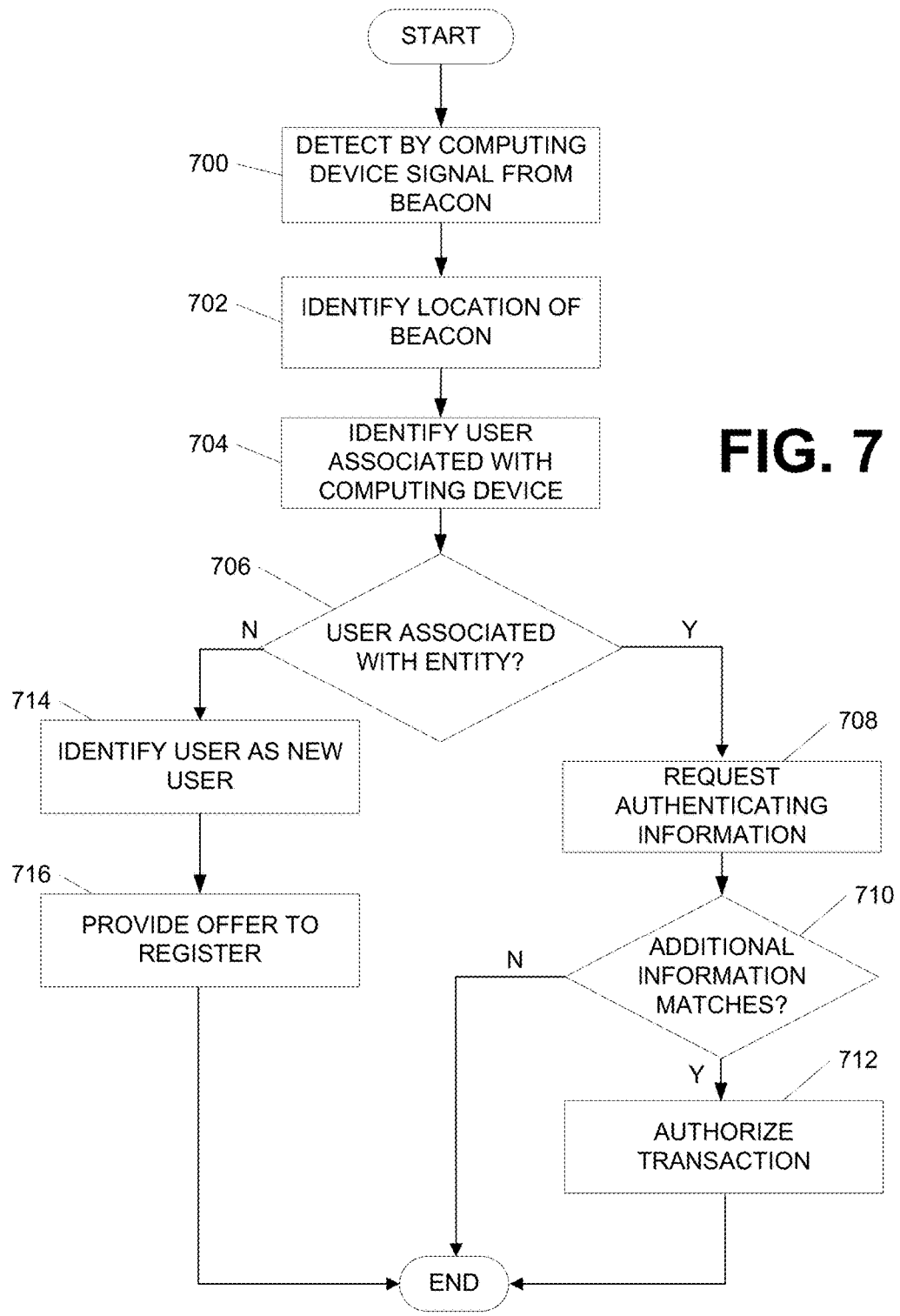
FIG. 7 illustrates an example method of identifying a user as a new user or an existing customer/registered user according to one or more aspects described herein.

FIG. 7 illustrates one example method of identifying a user as a new user or an existing customer/registered user according to one or more aspects described herein. In step 700, a signal from a location beacon may be detected by a personal computing device. As discussed above, the signal may be a low-power radio signal that may only be detectable when the detecting device (e.g., the personal computing device) is within a predetermined proximity of the beacon, which may be a relatively small distance. In step 702, the location of the beacon and, thus, the personal computing device, may be determined. The location may be determined in various ways, as discussed above.

In step 704, a user associated with the personal computing device may be identified. As discussed above, the user may be identified based on the unique identifier associated with the personal computing device, registration records or information, online or mobile banking information provided, or the like. In step 706, a determination may be made as to whether the user is associated with the entity. For instance, a determination may be made as to whether the user is a customer of the entity, such as a financial institution, whether the user has one or more accounts at the financial institution, whether the user is registered with the location determination and user identification system, and the like.

If, in step 706, the user is associated with the entity, authenticating information may be requested from the user in step 708. In step 710, a determination may be made as to whether the authenticating information matches records associated with the user. If so, the transaction may be authorized and, if not, the process may end (or additional information may be requested, as discussed above).

If, in step 706, it is determined that the user is not associated with the entity or is not a registered user of the system (e.g., in step 704 no user identity information is found or identified), then in step 714, the user may be identified or flagged as a new user (e.g., a user not registered with the system, a user that is not a customer of the bank, or the like). In step 716, one or more offers may be generated and provided to the user. For instance, the user may be prompted to register with the location determination and user identification system so that, at a subsequent detection of the user within the location, the user may be automatically authorized to conduct various transactions, as discussed herein. In another example, the user may be prompted to download an application, such as a mobile banking application, to provide additional functionality to the user. In still other examples, the user may be provided with offers to open an account, apply for a mortgage (may advertise possible interest rates), apply for a loan, and the like. Various other offers may be generated and provided to the user without departing from the invention.

Figure 8:
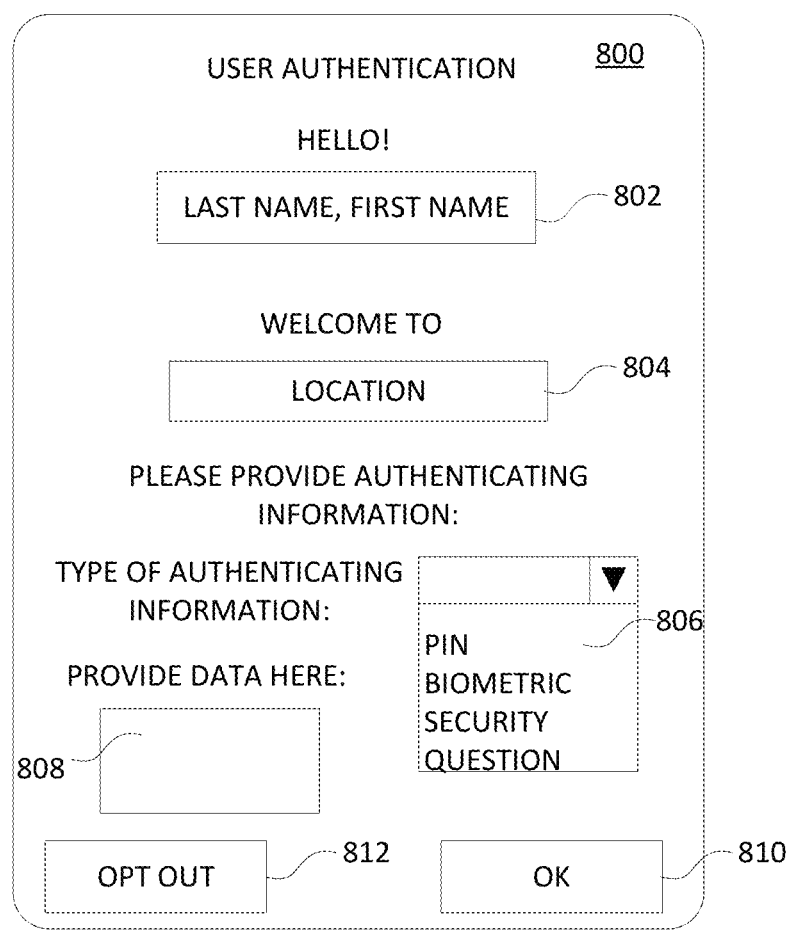
FIG. 8 illustrates one example user interface for requesting authentication information from a user according to one or more aspects described herein.

FIG. 8 illustrates one example user interface 800 requesting authentication information from a user according to one or more aspects described herein. For instance, the interface 800 may be transmitted to a personal computing device that has detected a location beacon and, accordingly, is identified as being located within a predefined proximity to the location beacon. As discussed above, the user associated with the personal computing device may be identified and, in some examples, the request for authentication information may be automatically generated and transmitted to the person computing device (e.g., upon determining the location of the personal computing device and identifying the user associated with the personal computing device).

The interface 800 includes field 802 in which the name of the identified user is provided. Field 804 provides the identified location of the user. For instance, field 804 may provide an identification of the branch or banking center at which the user has been determined to have a physical presence due to the presence of the personal computing device.

The interface 800 further includes a request for authentication information. In field 806, the user may select the type of authentication information to be provided. For instance, the types of authentication information may be provided via a drop down menu, or other selection option. Although interface 800 provides the user with options for the type of authentication information to provide, in some examples, the interface 800 may request a particular type of authentication information. For instance, the interface 800 may ask for the biometric data or PIN. Further, although the interface 800 includes a request for one type of authentication information, in some examples, two or more types of authentication information may be requested.

Field 808 provides an input region in which the user may provide the requested authentication information. For instance, the user may provide a PIN, fingerprint, or the like, in region 808.

Once the authentication information is provided, the system may, in some examples, automatically process the information. In other examples, the user may select "OK" option 810 to process the authentication information provided.

Interface 800 may further include an "OPT OUT" option 812. For instance, the system may automatically request authentication information in order to simplify one or more transactions being conducted by the user. However, in some arrangements, the user may prefer to provide identification and/or authentication information during the transaction, might not be conducting a transaction requiring any identification or authentication information, or the like. Accordingly, in instances in which the user desires to not authenticate via the system, the user may select "OPT OUT" option 812 and the system may cancel the authentication process. In these instances, the user may be asked to provide identification and/or authentication information during any transaction or type of transaction.

Figure 9:
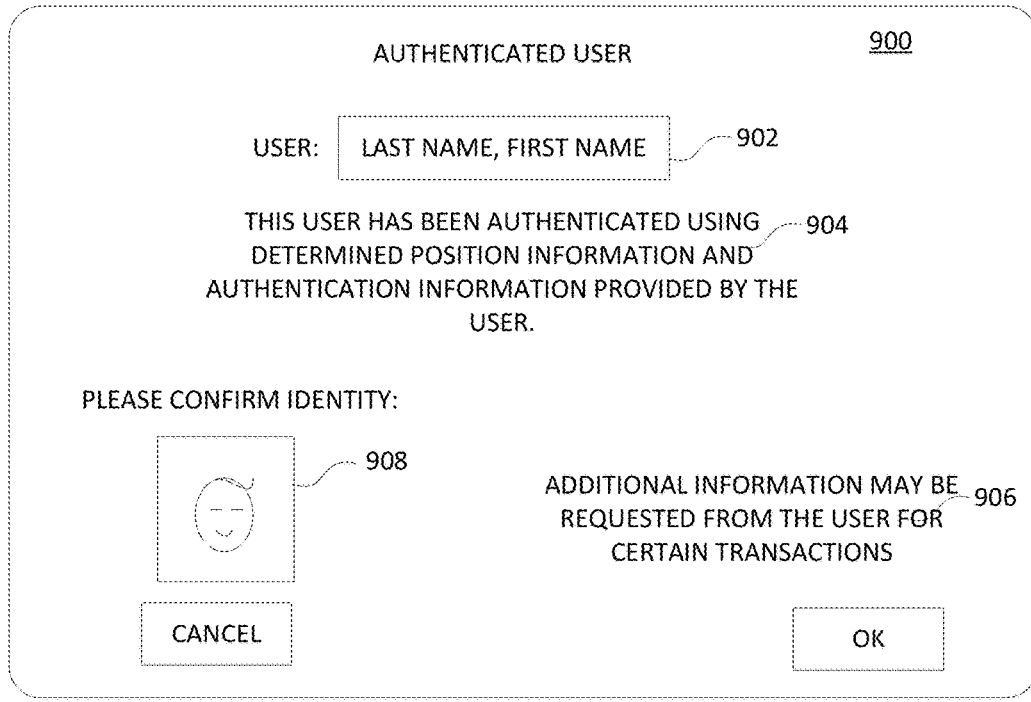
FIG. 9 illustrates one example notification that may be transmitted to an entity, such as a financial institution, or associate of the entity in accordance with one or more aspects described herein.

FIG. 9 illustrates one example user interface 900 that may be provided to a banking associated according to one or more aspects described herein. For instance, the user may provide the requested authentication information (such as via interface 800) and may be authenticated to the system. Accordingly, as the user conducts one or more transactions, a user interface 900 may be presented to a banking associate working with the user to complete the transactions. The interface 900 may include field 902 in which the name of the user is provided. In region 904, an indication of the user authentication via the location determination and user identification system is provided to the banking associate.

In field 908, an image of the user is provided. In some examples, the image may be stored in the system (such as in user data module 408). The image of the user may be captured when the user registers with the system, during another transaction, or at any time. The image may be provided as an additional security measure for the banking associate or teller to confirm the identity of the user, possibly without requesting additional identification and/or authentication information from the user. If the user working with the banking associate or teller is not the person shown in the image, the banking associate may stop the transaction, request additional identification or authentication information, or the like. Interface 900 further includes region 906 providing an indication that, for some transactions or types of transactions, additional identification and/or authentication information may be requested from the user.

Figure 10:
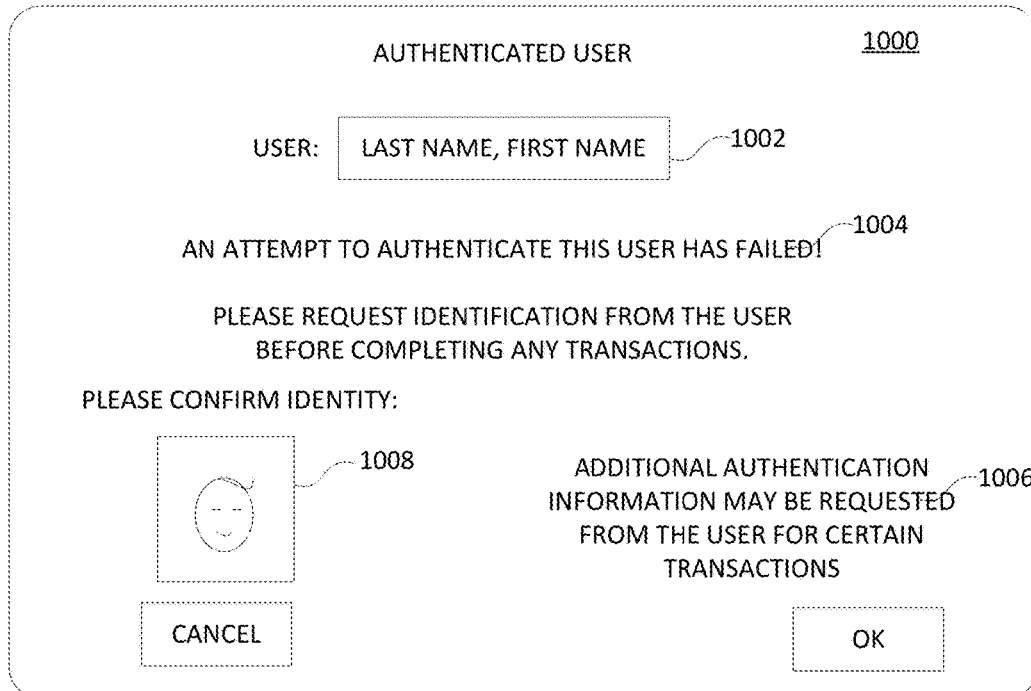
FIG. 10 illustrates another example user interface that may be transmitted to an entity, such as a financial institution, or associate of the entity in accordance with one or more aspects described herein.

FIG. 10 illustrates one user interface 1000 that may be presented to a banking associate or teller indicating that the authentication of the user has failed, according to one or more aspects described herein. Interface 1000 includes field 1002 in which the name of the user is provided. Interface 1000 further includes region 1004 in which an indication is provided that an attempt to authenticate the user was made by the system and failed. Accordingly, identification may be (or, in some examples, must be) requested from the user prior to completing or conducting the transaction.

Interface 1000 further includes an image of the user in field 1008. The image of the user may provide an additional security measure to the banking associate and may permit the banking associate to confirm the identity of the user. Interface 1000 further includes an indication in region 1006 that additional authentication information (e.g., in addition to identification information) may be requested from the user in order to conduct one or more transactions or types of transactions. For instance, the user may be requested to input a PIN, provide biometric data, provide a signature, or the like, either to or in the presence of the banking associate.

The example user interfaces shown in FIGS. 8-10 are merely some examples of user interfaces that may be used in conjunction with the systems, methods, apparatuses, and/or computer-readable media described herein. Various other interfaces, including more or less information, may be provided without departing from the invention.

Below are various example arrangements in which the location determination and user identification system may be implemented. The arrangements discussed below are merely some example arrangements and should not be viewed as limiting the disclosure in any way. Various other arrangements may be implemented or used without departing from the invention.

As discussed above, the location determination and user identification system may implement proximity positioning systems, or features associated therewith, to identify a user and determine a location of a user in order to authenticate a user. Additional services and/or functionality may then be provided to the user and/or a financial institution or other entity implementing the system, based on this information.

For example, as discussed above, a location and identity of a user may be determined, based on a personal computing device of the user detecting a signal from a location beacon. That information, coupled with received authentication information, may be used to authenticate the user in order to conduct one or more transactions or types of transactions. As discussed above, the authentication information may be requested from the user automatically upon determining the location and identity of the user, or automatically upon the user initiating a transaction. In arrangements in which the authentication information is requested responsive to a user initiating a transaction, the authentication of the user may be for the initiated transaction or, in some examples, for the initiated transaction as well as additional transactions or types of transactions, as discussed herein.

In one arrangement, a user, having a personal device with them, may enter a branch or banking center of a financial institution. Upon entering the banking center, the personal computing device of the user may detect a location beacon arranged at the banking center. Accordingly, the location of the personal device, and the user, may be determined based on the location of the location beacon. The identity of the user may be determined and a request for authentication information may be transmitted to the personal computing device. The user may then input the requested authentication information into the personal computing device and, if the information matches pre-stored authentication information, the user may be authenticated based on the determined location, determined identity, and received authentication information. The user may then be authorized to conduct various transactions or types of transactions without providing additional identification or authentication information. For instance, the user may be able to make a withdrawal from an account without providing photo identification. Instead, the authentication process described herein may be sufficient to confirm the identity of the user.

As discussed above, authentication information may include a PIN, password, biometric data, and the like. In some examples, the user may be authenticated based on detection, by a second personal computing device associated with the user, of the location beacon. For instance, if a user and his or her spouse enter a banking center with a location beacon, the personal computing device of each of the user and the spouse may detect the signal from the beacon and the system may determine the location of each personal computing device and each user associated with the personal computing devices. In some examples, the user information (e.g., stored in user data module 408) may include additional users or people associated with the user (e.g., a spouse, parent, child, or the like) and device identifying information for those people. Accordingly, if the system determines that the location of both devices is the same, and the users are identified as being related or associated with each other, that may be sufficient to authenticate a user (e.g., without requiring additional authenticating information, such as a PIN, biometric data, or the like). For instance, the system may determine that the risk of both, associated personal computing devices detecting the same location beacon without the user being physically present is low and, thus, this may serve to authenticate the user.

Further, the arrangements discussed herein may include detection of a signal by a personal computing device and transmitting the signal, or data associated therewith, to another portion of the system or another device, to determine the location of the beacon and/or device, as well as the identity of the user associated with the device. However, in some arrangements, the personal computing device may be configured to determine the location of the beacon, and thus, the location of the personal computing device, based on the received signal (e.g. by matching a signal that may be unique to the beacon with a stored list of beacons and associated locations). Some or all aspects of this arrangement may be performed by one or more applications associated with the personal computing device, such as an online or mobile banking application. The application may then determine the identity of the user (e.g., with or without accessing other devices) and may transmit user information to another device or component of the system to provide the additional functionality, as discussed herein.

The various arrangements discussed herein aid in improving customer service experiences for a user, as well as providing additional security to an entity and/or a user or customer.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
receiving, by a location determination and user identification system having at least one processor, data associated with a signal detected by a personal computing device, the signal being emitted from a location beacon at a banking center of a financial institution;
determining, by the location determination and user identification system, a location of the personal computing device based on the received data associated with the signal emitted from the location beacon, wherein the location of the personal computing device is within a predefined proximity of a location of the location beacon;
extracting, by the location determination and user identification system, a unique identifier associated with the personal computing device, the unique identifier including an international mobile station equipment identity (IMEI) of the personal computing device;
determining, by the location determination and user identification system and based on the extracted unique identifier associated with the personal computing device, an identity of a user associated with the personal computing device;
requesting, by the location determination and user identification system, authentication information of the identified user;
receiving, by the location determination and user identification system, the requested authentication information of the user;
determining, by the location determination and user identification system, whether the received authentication information of the user matches pre-stored authentication information associated with the user; and
responsive to determining that the received authentication information of the user matches the pre-stored authentication information associated with the user, authorizing the user to conduct a first plurality of transactions or types of transactions.

2. The method of claim 1, wherein authorizing the user to conduct a first plurality of transactions or types of transactions includes authorizing the user to conduct the first plurality of transactions or types of transactions without additional identification or authentication information from the user.

3. The method of claim 1, wherein requesting authentication information from the identified user includes transmitting a request for the authentication information to the personal computing device.

4. The method of claim 1, wherein receiving the requested authentication information of the user includes receiving the requested authentication information from the personal computing device.

5. The method of claim 1, wherein the requested authentication information includes at least one of: a personal identification number (PIN) of the user, biometric data of the user, a password of the user, and a response to a predefined security question.

6. The method of claim 1, wherein authorizing the user to conduct the first plurality of transactions or types of transactions is based on the determined identity of the user associated with the personal computing device and the determined the location of the personal computing device.

7. The method of claim 1, wherein authorizing the user to conduct a first plurality of transactions or types transactions further includes identifying a second plurality of transactions or types of transactions as requiring additional identification or authentication information from the user prior to conducting a transaction or type of transaction in the second plurality of transactions or types of transactions.

8. The method of claim 1, further including transmitting, to a computing device of a banking associate, an image of the user and, responsive to determining that the authentication information matches, confirming that the user matches the image of the user.

9. The method of claim 1, further including responsive to determining that the authentication information does not match, requesting additional identification from the user prior to conducting any type of transaction.

10. The method of claim 9, wherein requesting additional identification from the user includes requesting a photo identification of the user.

11. An apparatus, comprising:
at least one processor; and
a memory storing instructions that when executed by the at least one processor cause the apparatus to:
receive data associated with a signal detected by a personal computing device, the signal being emitted from a location beacon at a banking center of a financial institution;
determine a location of the personal computing device based on the received data associated with the signal emitted from the location beacon, wherein the location of the personal computing device is within a predefined proximity of a location of the location beacon;
extract a unique identifier associated with the personal computing device, the unique identifier including an international mobile station equipment identity (IMEI) of the personal computing device;
determine, based on the extracted unique identifier associated with the personal computing device, an identity of a user associated with the personal computing device;
request authentication information of the identified user;
receive the requested authentication information of the user;
determine whether the received authentication information of the user matches pre-stored authentication information associated with the user; and
responsive to determining that the received authentication information of the user matches the pre-stored authentication information associated with the user, authorize the user to conduct a first plurality of transactions or types of transactions.

12. The apparatus of claim 11, wherein authorizing the user to conduct a first plurality of transactions or types of transactions includes authorizing the user to conduct the first plurality of transactions or types of transactions without additional identification or authentication information from the user.

13. The apparatus of claim 11, wherein receiving the requested authentication information of the user includes receiving the requested authentication information from the personal computing device.

14. The apparatus of claim 11, wherein authorizing the user to conduct the first plurality of transactions or types of transactions is based on the determined identity of the user associated with the personal computing device and the determined the location of the personal computing device.

15. The apparatus of claim 11, wherein authorizing the user to conduct a first plurality of transactions or types transactions further includes identifying a second plurality of transactions or types of transactions as requiring additional identification or authentication information from the user prior to conducting a transaction or type of transaction in the second plurality of transactions or types of transactions.

16. The apparatus of claim 11, further including instructions that, when executed, cause the apparatus to:
responsive to determining that the authentication information does not match, request additional identification from the user prior to conducting any type of transaction.

17. One or more non-transitory computer-readable media having instructions stored thereon that when executed by one or more computers cause the one or more computers to:
receive data associated with a signal detected by a personal computing device, the signal being emitted from a location beacon at a banking center of a financial institution;
determine a location of the personal computing device based on the received data associated with the signal emitted from the locating beacon, wherein the location of the personal computing device is within a predefined proximity of a location of the locating beacon;
extract a unique identifier associated with the personal computing device, the unique identifier including an international mobile station equipment identity (IMEI) of the personal computing device;
determine, based on the extracted unique identifier associated with the personal computing device, whether an identity of a user associated with the personal computing device can be determined;
responsive to determining that the identity of the user associated with the personal computing device cannot be determined, generating at least one offer for the user associated with the personal computing device; and
transmit the at least one offer to the personal computing device.

18. The one or more non-transitory computing readable media of claim 17, wherein the at least one offer includes at least one of: an offer to download an application to the personal computing device and an offer to register with a system.

19. The one or more non-transitory computer-readable media of claim 17, further including instructions that, when executed, cause the one or more computers to:
responsive to determining that the identity of the user associated with the personal computing device can be determined, identify the user associated with the personal computing device;
request authentication information of the identified user;
receive the requested authentication information of the identified user;
determine whether the received authentication information of the user matches pre-stored authentication information associated with the identified user; and
responsive to determining that the received authentication information of the identified user matches the pre-stored authentication information associated with the identified user, authorize the identified user to conduct a first plurality of transactions or types of transactions.

20. The one or more non-transitory computer-readable media of claim 19, further including instructions that, when executed, cause the one or more computers to:
responsive to determining that the authentication information does not match, request additional identification from the user prior to conducting any type of transaction.

* * * * *